(12) United States Patent
Kim et al.

(10) Patent No.: US 10,737,689 B2
(45) Date of Patent: Aug. 11, 2020

(54) PARKING ASSISTANCE APPARATUS AND VEHICLE HAVING THE SAME

(71) Applicant: LG ELECTRONICS INC., Seoul (KR)

(72) Inventors: Cheolmun Kim, Seoul (KR); Kwangjin Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 226 days.

(21) Appl. No.: 15/723,433

(22) Filed: Oct. 3, 2017

(65) Prior Publication Data

US 2018/0093663 A1    Apr. 5, 2018

(30) Foreign Application Priority Data

Oct. 4, 2016 (KR) .................... 10-2016-0127525

(51) Int. Cl.
| | |
|---|---|
| *B60W 30/06* | (2006.01) |
| *B60W 10/20* | (2006.01) |
| *B60W 10/18* | (2012.01) |
| *B60W 50/14* | (2020.01) |
| *G08G 1/16* | (2006.01) |

(52) U.S. Cl.
CPC ............ *B60W 30/06* (2013.01); *B60W 10/18* (2013.01); *B60W 10/20* (2013.01); *B60W 50/14* (2013.01); *G08G 1/165* (2013.01); *G08G 1/166* (2013.01); *G08G 1/168* (2013.01); *B60W 2050/146* (2013.01); *B60W 2554/00* (2020.02); *B60W 2720/10* (2013.01)

(58) Field of Classification Search
None
See application file for complete search history.

(56) References Cited

U.S. PATENT DOCUMENTS

| | | |
|---|---|---|
| 7,161,616 B1 | 1/2007 | Okamoto et al. |
| 8,571,722 B2 | 10/2013 | Samples et al. |
| 9,361,803 B2 | 6/2016 | Lee |
| 9,415,774 B2 | 8/2016 | Sugano et al. |

(Continued)

FOREIGN PATENT DOCUMENTS

| | | |
|---|---|---|
| CN | 1344470 | 4/2002 |
| CN | 102762436 | 10/2012 |

(Continued)

OTHER PUBLICATIONS

European Search Report in European Application No. 17001536.6, dated Aug. 29, 2018, 15 pages.

(Continued)

*Primary Examiner* — Dale W Hilgendorf
*Assistant Examiner* — Alexander C. Bost
(74) *Attorney, Agent, or Firm* — Fish & Richardson P.C.

(57) ABSTRACT

A parking assistance apparatus includes a display unit configured to display an image of an area around a vehicle; a sensor unit configured to detect at least one object around the vehicle; and at least one processor. The at least one processor is configured to perform an automatic parking function that moves the vehicle to a target parking position by: calculating a congestion level for the automatic parking function based on information about the at least one object around the vehicle detected by the sensor unit; and executing the automatic parking function according to the calculated congestion level.

23 Claims, 40 Drawing Sheets

(56) References Cited

U.S. PATENT DOCUMENTS

| | | | |
|---|---|---|---|
| 9,862,379 B2 * | 1/2018 | Seo | B60W 10/06 |
| 2006/0287825 A1 | 12/2006 | Shimizu et al. | |
| 2012/0101654 A1 | 4/2012 | Samples et al. | |
| 2013/0124041 A1 | 5/2013 | Belser et al. | |
| 2014/0200799 A1 | 7/2014 | Sugano et al. | |
| 2015/0179075 A1 | 6/2015 | Lee | |
| 2015/0203111 A1 * | 7/2015 | Bonnet | B62D 15/027 701/25 |
| 2016/0272244 A1 | 9/2016 | Imai et al. | |
| 2017/0008515 A1 * | 1/2017 | Seo | B60W 30/06 |
| 2017/0262727 A1 * | 9/2017 | Kozuka | G06K 9/4604 |
| 2017/0262728 A1 * | 9/2017 | Kozuka | G06K 9/4604 |
| 2017/0313306 A1 * | 11/2017 | Nordbruch | B62D 15/0285 |
| 2018/0093676 A1 * | 4/2018 | Emura | B60K 37/06 |
| 2018/0178780 A1 * | 6/2018 | Hwang | B60W 30/06 |
| 2018/0308358 A1 * | 10/2018 | Hayakawa | B62D 15/02 |
| 2018/0308359 A1 * | 10/2018 | Hayakawa | B60R 21/00 |
| 2019/0039606 A1 * | 2/2019 | Fujita | B62D 15/0285 |
| 2019/0202447 A1 * | 7/2019 | Taniguchi | B60R 21/00 |

FOREIGN PATENT DOCUMENTS

| | | |
|---|---|---|
| CN | 103373349 | 10/2013 |
| CN | 103380351 | 10/2013 |
| CN | 103826929 | 5/2014 |
| CN | 104723991 | 6/2015 |
| CN | 105683000 | 6/2016 |
| DE | 10-2014-111122 A | 2/2016 |
| EP | 1065642 | 1/2001 |
| EP | 1179958 A | 2/2002 |
| EP | 2759449 A1 | 7/2014 |
| JP | H05-203736 | 8/1993 |
| JP | 2009126495 | 6/2009 |
| JP | 2011079372 | 4/2011 |
| JP | 2012116366 | 6/2012 |
| JP | 2012-176748 | 9/2012 |
| JP | 2010-282282 | 12/2012 |
| JP | 2012-240659 | 12/2012 |
| JP | 2013-241087 | 12/2013 |
| JP | 2013241087 | 12/2013 |
| JP | 2014-094725 | 5/2014 |
| JP | 2014-154100 | 8/2014 |
| JP | 2016-053846 | 4/2016 |
| KR | 1020110074629 | 6/2011 |
| KR | 10-2012-0118116 | 10/2013 |
| KR | 10-2012-0118073 | 10/2014 |
| KR | 10-1604758 | 3/2016 |

OTHER PUBLICATIONS

Partial European Search Report in European Application No. 17001536.6, dated Mar. 23, 2018, 14 pages.

Chinese Office Action in Chinese Application No. 201710069023.1, dated Jun. 11, 2020; 10 pages (with English translation).

* cited by examiner

PARKING ASSISTANCE APPARATUS AND VEHICLE HAVING THE SAME

CROSS-REFERENCE TO RELATED APPLICATIONS

The present application claims priority under 35 U.S.C. 119 and 35 U.S.C. 365 to Korean Patent Application No. 10-2016-0127525 filed on Oct. 4, 2016, which is hereby incorporated by reference in its entirety.

TECHNICAL FIELD

The present disclosure relates to a parking assistance apparatus and a vehicle having the same.

BACKGROUND

A vehicle is an apparatus that transports a user in a desired direction. A common example of a vehicle is an automobile.

A vehicle is typically powered by a motor, and may be, for example, an internal combustion engine vehicle, an external combustion engine vehicle, a gas turbine vehicle, an electric vehicle, etc. according to a type of motor used.

An electric vehicle refers to a vehicle that operates using an electric motor with electric energy, examples of which include pure electric vehicles, hybrid electric vehicles (HEVs), plug-in hybrid electric vehicles (PHEVs), fuel cell electric vehicles (FCEVs), etc.

SUMMARY

Implementations described herein provide a parking assistance apparatus that performs an automatic parking operation for a vehicle according to a congestion level of the vehicle's surroundings.

In one aspect, a parking assistance apparatus includes a display unit configured to display an image of an area around a vehicle; a sensor unit configured to detect at least one object around the vehicle; and at least one processor. The at least one processor is configured to perform an automatic parking function that moves the vehicle to a target parking position by: calculating a congestion level for the automatic parking function based on information about the at least one object around the vehicle detected by the sensor unit; and executing the automatic parking function according to the calculated congestion level.

In some implementations, the at least one processor is configured to: determine a first region within a first distance from the vehicle; and calculate the congestion level for the automatic parking function according to a number of the at least one object detected within the first region.

In some implementations, the at least one processor is configured to: detect at least one characteristic of a first object among the at least one object detected around the vehicle; and calculate the congestion level for the automatic parking function based on a first weight value assigned to the first object that depends on the at least one characteristic of the first object.

In some implementations, the at least one processor is configured to calculate the congestion level for the automatic parking function based on the first weight value increasing as a distance between the vehicle and the first object decreases.

In some implementations, the at least one processor is configured to calculate the congestion level for the automatic parking function based on the first weight value depending on a movement speed and a movement direction of the first object.

In some implementations, the at least one processor is configured to: detect a type of the first object by performing a machine learning operation on at least one image of the first object; and calculate the congestion level for the automatic parking function based on the first weight value that depends on the detected type of the first object.

In some implementations, the at least one processor is configured to: calculate an expected duration for the automatic parking function that increases with increasing values of the congestion level; and control the display unit to further display the congestion level and the expected duration for the automatic parking function.

In some implementations, the at least one processor is configured to determine, according to the congestion level for the automatic parking function, a boundary range of the vehicle based on which the vehicle performs at least one braking operation during the automatic parking function, the boundary range indicating a range within which the vehicle is controlled to travel during the automatic parking function.

In some implementations, the at least one processor is configured to determine the boundary range of the vehicle according to the congestion level by: determining a first size of the boundary range of the vehicle in a first state in which the congestion level is a first level; and determining a second size of the boundary range, larger than the first size, in a second state in which the congestion level is a second level that is lower than the first level.

In some implementations, the at least one processor is configured to determine a size of the boundary range of the vehicle differently depending on a parking path by which the vehicle is controlled to travel during the automatic parking function.

In some implementations, the at least one processor is configured to determine, according to the boundary range of the vehicle, a movement speed of the vehicle for the automatic parking function.

In some implementations, the at least one processor is configured to: perform the automatic parking function to control the vehicle to move at a first speed in a first state in which a size of the boundary range of the vehicle is a first size, and perform the automatic parking function to control the vehicle to move at a second speed, greater than the first speed, in a second state in which the size of the boundary range of the vehicle is a second size that is greater than the first size.

In some implementations, the at least one processor is configured to: determine the boundary range of the vehicle according to a parking path by which the vehicle is controlled to travel during the automatic parking function; and control the display unit to further display the parking path and the boundary range of the vehicle.

In some implementations, the at least one processor is configured to: control the display unit to display the image of the area around the vehicle with a first zoom in a first state in which a size of the boundary range is a first size, and control the display unit to display the image of the area around the vehicle with a second zoom that is less than the first zoom in a second state in which the size of the boundary range is a second size greater than the first size.

In some implementations, the at least one processor is configured to: determine a first parking path by which the vehicle is controlled to travel to the target parking position during the automatic parking function, based on the congestion level being a first congestion level; and determine a second parking path, different from the first parking path, based on the congestion level being a second congestion level different from the first congestion level.

In some implementations, the second congestion level is greater than the first congestion level, and the at least one processor is configured to determine the second parking path having a second number of turns that is greater than a first number of turns in the first parking path.

In some implementations, the second congestion level is greater than the first congestion level, and the at least one processor is configured to determine the second parking path having a second maximum movement position that is smaller than a first maximum movement position of the first parking path.

In some implementations, the at least one processor is configured to: determine the first parking path based on a first parking method that depends on the first congestion level; and determine the second parking path based on a second parking method, different from the first parking method, based on the second congestion level.

In some implementations, the at least one processor is configured to: control the display unit to display the first parking path in a first state in which the congestion level is the first congestion level; and control the display unit to display the second parking path in a second state in which the congestion level is the second congestion level.

In another aspect, a method of providing an automatic parking function includes: sensing an environment around a vehicle; obtaining information about at least one object in the environment around the vehicle; and performing an automatic parking function for the vehicle by: calculating a congestion level of the environment around the vehicle based on the information about the at least one object; and executing the automatic parking function according to the calculated congestion level.

In some implementations, calculating the congestion level of the environment around the vehicle based on the information about the at least one object includes: calculating the congestion level based on a number of the at least one object detected within a first region around the vehicle.

In some implementations, executing the automatic parking function according to the calculated congestion level includes: determining, according to the congestion level, a size of a boundary range of the vehicle based on which the vehicle performs at least one braking operation during the automatic parking function, the boundary range indicating a range within which the vehicle is controlled to travel during the automatic parking function.

In some implementations, executing the automatic parking function according to the calculated congestion level further includes: determining a movement speed of the vehicle for the automatic parking function according to the determined boundary range of the vehicle.

In another aspect, a vehicle includes a parking assistance apparatus according to one or more of the implementations described above.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that may include one or more processing devices and memory to store executable instructions to implement the stated functions.

The details of one or more implementations are set forth in the accompanying drawings and the description below. Other features will be apparent from the description and drawings, and from the claims.

DETAILED DESCRIPTION

Figure 1:
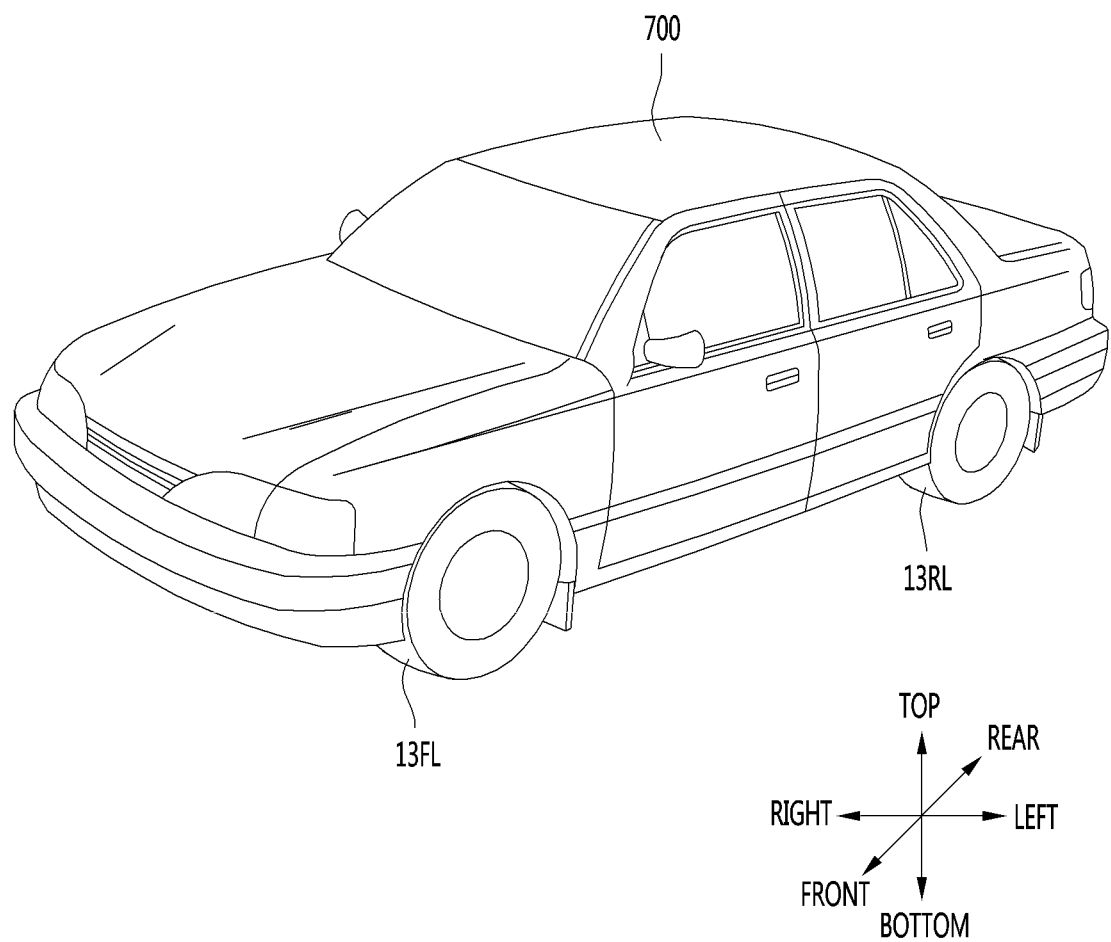
FIG. 1 is a diagram illustrating an example of a vehicle having a parking assistance apparatus according to some implementations.

Intelligent vehicles are typically designed to improve safety or convenience of drivers or pedestrians. An intelligent vehicle is an advanced vehicle using information technology (IT), and is sometimes referred to as a smart vehicle. Some intelligent vehicles are designed to improve traffic efficiency by utilizing an advanced vehicle system via association with an intelligent traffic system (ITS).

In addition, intelligent vehicles are designed to implement various sensors. Examples of such sensors include a camera, an infrared sensor, a radar, a global positioning system (GPS), a Lidar, a gyroscope, etc. In particular, a camera is an important sensor that plays the role of human eyes.

In some implementations, a camera system of a vehicle may implement an around-view monitoring (AVM) system, which photographs surroundings of a vehicle. The camera system may also or alternatively include a rear camera.

In some implementations, an intelligent vehicle implements an automatic parking technology designed to automatically perform a parking operation for a vehicle. Such automatic parking technologies may facilitate parking in various situations for drivers. As an example, an automatic parking technology can detect a parking lane by using a camera and automatically park a vehicle in a detected parking space within the parking lane.

An automatic parking function may, however, face challenges in operating effectively in congested environments where persons or objects are located in a vicinity of the vehicle. In such scenarios, the automatic parking function may have difficulty in detecting an empty space or a parking lane.

In particular, automatic parking functions may face challenges in that the vehicle is frequently stopped and longer delays result for parking in congested environments where multiple fixed objects or moving objects exist around the vehicle during automatic parking.

Implementations described herein provide a parking assistance apparatus and a vehicle having the same, which provide an improved automatic parking function according to a congestion level of the vehicle's surroundings.

According to some implementations, the parking assistance apparatus adaptively executes automatic parking depending on the congestion level of the vehicle's surroundings, for example by using different vehicle boundary ranges in which the vehicle travels, different movement speeds, different parking paths, and/or different parking methods. As such, the parking assistance apparatus can perform automatic parking function smoothly even in a congested environment.

Specifically, in some implementations, the parking assistance apparatus sets a monitoring region around the vehicle and calculates a congestion level by assigning a weight value according to characteristics of an object detected in the environment. As such, the parking assistance apparatus can more precisely measure the congestion level of the vehicle's surroundings, based on characteristics of different objects.

Also, according to some implementations, the parking assistance device executes the automatic parking function in different manners depending on the calculated congestion level. For example, the vehicle can be automatically parked efficiently and quickly in environments in which the congestion level is low. In addition, the vehicle can be automatically parked safely and without frequent stop in a congested environment in which the congestion level is high.

According to some implementations, when the congestion level is high, the parking assistance device may reduce the size of the vehicle boundary range to prevent frequent stopping of the vehicle and perform control such that the vehicle is moved at a low speed for safety. As such, the parking assistance apparatus can perform the automatic parking function smoothly even when the vehicle's surroundings are congested.

According to some implementations, the parking assistance device may expand the vehicle boundary range while moving the vehicle at a higher speed when the congestion level is low. As such, the parking assistance apparatus can allow the vehicle to be parked safely and rapidly in environments where congestion is light.

Also, in some implementations, the parking assistance device may design a parking path according to the congestion level to reduce interference with an object during parking of the vehicle, smoothly executing the automatic parking function even when the vehicle's surroundings are congested.

A vehicle as described in this specification may include a car and a motorcycle. Hereinafter, examples of a car will be focused upon.

A vehicle as described in this specification may be an internal combustion engine vehicle including an engine as a power source, a hybrid vehicle including both an engine and an electric motor as a power source, or an electric vehicle including an electric motor as a power source.

In the following description, the left of a vehicle refers to the left of the vehicle in the direction of travel and the right of the vehicle refers to the right of the vehicle in the direction of travel.

In the following description, a left hand drive (LHD) vehicle will be focused upon unless otherwise stated.

In the following description, the parking assistance apparatus is provided in a vehicle and may be configured to exchange information for data communication with the vehicle and to perform a parking assistance function. One or more components or units of the vehicle may be part of a parking assistance apparatus.

In scenarios in which the parking assistance apparatus is separately provided, at least some components or units (e.g., see FIG. 2) of the parking assistance apparatus may not be included in the parking assistance apparatus but may be part of the vehicle or part of another apparatus mounted in the vehicle. Such external units transmit and receive data via an interface of the parking assistance apparatus and thus may be understood as being included in the parking assistance apparatus.

Hereinafter, for convenience of description, implementations are described in which the parking assistance apparatus directly includes the components and units shown in FIG. 2. However, as mentioned above, implementations are not limited thereto, and the parking assistance apparatus may include components or units that are part of the vehicle itself or part of another apparatus mounted in the vehicle (e.g., a terminal).

Hereinafter, the parking assistance apparatus according to the implementation will be described in detail with reference to the drawings.

Referring to FIG. 1, the vehicle according to the implementation may include wheels 13FL and 13RL rotated by a power source and a parking assistance apparatus for providing driver assistance information to a user.

Specifically, the parking assistance apparatus 100 calculates a congestion level of a vehicle's surroundings by detecting objects around the vehicle and performs control such that the vehicle automatically moves to a target parking position based on the calculated congestion level, providing an automatic parking function.

As such, in some implementations, the parking assistance apparatus 100 may discriminate a congested environment in which a plurality of objects exist around a vehicle from a comfortable environment in which a relatively small number of objects exist and the vehicle is in comfortable surroundings, and provide information about a vehicle boundary range, a movement speed, a parking path, a parking method to a user differently depending on the environment of the vehicle's surroundings. This may enable providing the automatic parking function smoothly even in congested environments.

Figure 2:
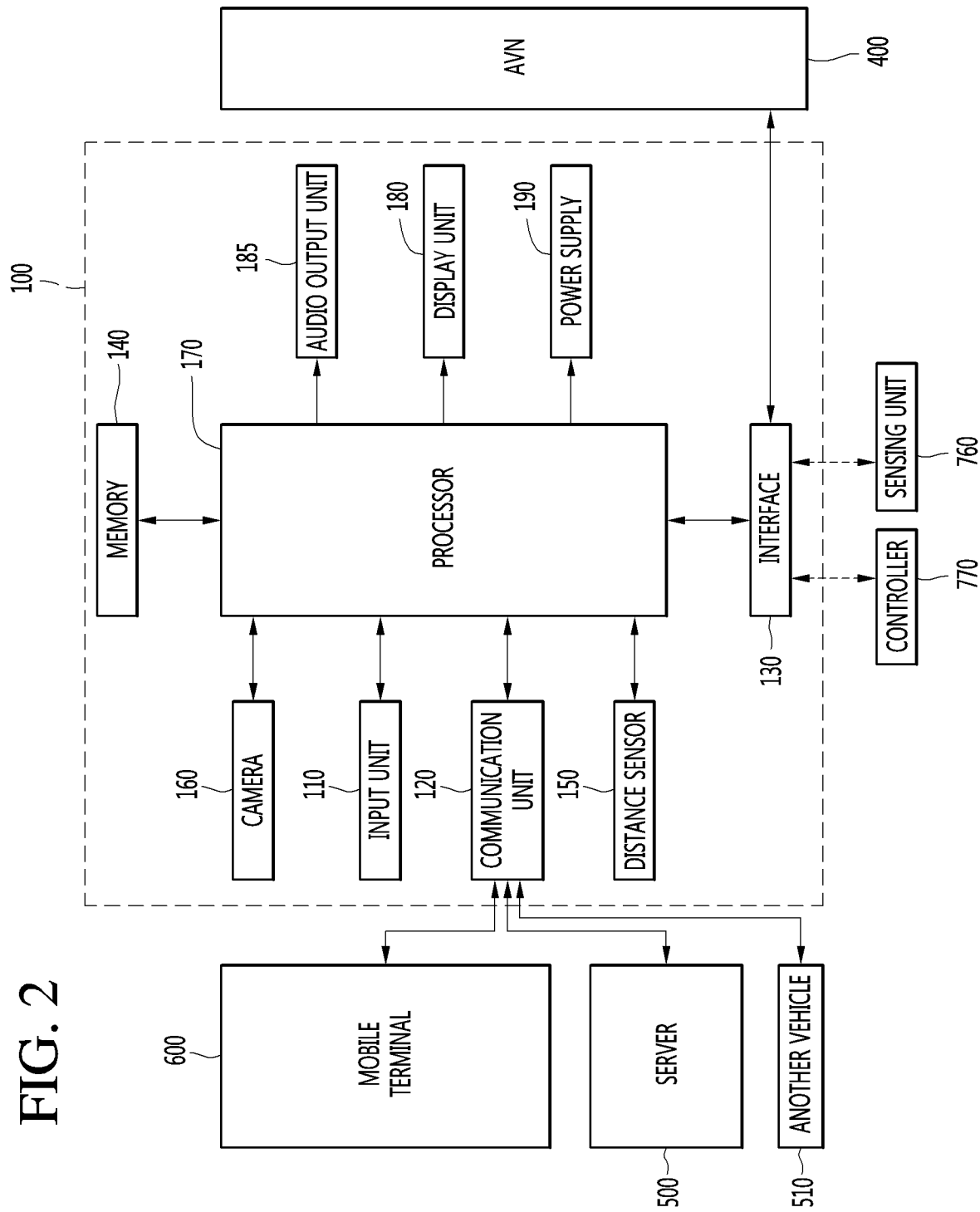
FIG. 2 is a block diagram illustrating an example of a parking assistance apparatus according to some implementations.

Referring to FIG. 2, such a parking assistance apparatus 100 may include an input unit 110, a communication unit 120, an interface 130, a memory 140, a sensor unit 155, at least one processor such as processor 170, a display unit 180, an audio output unit 185 and a power supply 190. The units of the parking assistance apparatus 100 shown in FIG. 2 are not essential to implementation of the parking assistance apparatus 100 and thus the parking assistance apparatus 100 described in the present specification may have components greater or less in number than the number of the above-described components.

Each component will now be described in detail. The parking assistance apparatus 100 may include the input unit 110 for receiving user input.

For example, a user may input a signal for setting a parking assistance function provided by the parking assistance apparatus 100 or an execution signal for turning the parking assistance apparatus 100 on/off.

The input unit 110 may include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

Next, the parking assistance apparatus 100 may include the communication unit 120 for communicating with another vehicle 510, a terminal 600 and a server 500.

The parking assistance apparatus 100 may receive communication information including at least one of navigation information, driving information of another vehicle and traffic information via the communication unit 120. In contrast, the parking assistance apparatus 100 may transmit information on this vehicle via the communication unit 120.

In detail, the communication unit 120 may receive at least one of position information, weather information and road traffic condition information (e.g., transport protocol experts group (TPEG), etc.) from the mobile terminal 600 and/or the server 500.

The communication unit 120 may receive traffic information from the server 500 having an intelligent traffic system (ITS). Here, the traffic information may include traffic signal information, lane information, vehicle surrounding information or position information.

In addition, the communication unit 120 may receive navigation information from the server 500 and/or the mobile terminal 600. Here, the navigation information may include at least one of map information related to vehicle driving, lane information, vehicle position information, set destination information and route information according to the destination.

For example, the communication unit 120 may receive the real-time position of the vehicle as the navigation information. In detail, the communication unit 120 may include a global positioning system (GPS) module and/or a Wi-Fi (Wireless Fidelity) module and acquire the position of the vehicle.

In addition, the communication unit 120 may receive driving information of the other vehicle 510 from the other vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the parking assistance apparatus 100 may pair with each other automatically or by executing a user application.

The communication unit 120 may exchange data with the other vehicle 510, the mobile terminal 600 or the server 500 in a wireless manner.

In detail, the communication module 120 can perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit module 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

In addition, the parking assistance apparatus 100 may pair with the mobile terminal located inside the vehicle using a short-range communication method and wirelessly exchange data with the other vehicle 510 or the server 500 using a long-distance wireless communication module of the mobile terminal.

Next, the parking assistance apparatus 100 may include the interface 130 for receiving data of the vehicle and transmitting a signal processed or generated by the processor 170.

In detail, the parking assistance apparatus 100 may receive at least one of driving information of another vehicle, navigation information and sensor information via the interface 130.

In addition, the parking assistance apparatus 100 may transmit a control signal for executing a parking assistance function or information generated by the parking assistance apparatus 100 to at least one processor, such as controller 770 of the vehicle, via the interface 130.

The parking assistance apparatus 100 may transmit a control signal, such as steering, driving, or braking for allowing the vehicle to move to the target parking position, to a vehicle driving unit through the interface unit 130, controlling vehicle movement.

To this end, the interface 130 may perform data communication with at least one of the controller 770 of the vehicle, an audio-video-navigation (AVN) apparatus 400 and the sensing unit 760 using a wired or wireless communication method.

In detail, the interface 130 may receive navigation information by data communication with the controller 770, the AVN apparatus 400 and/or a separate navigation apparatus.

In addition, the interface 130 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, a door sensor, etc. The position module may include a GPS module for receiving GPS information.

The interface 130 may receive user input via the user input unit 110 of the vehicle. The interface 130 may receive user input from the input unit of the vehicle or via the controller 770. That is, when the input unit is provided in the vehicle, user input may be received via the interface 130.

In addition, the interface 130 may receive traffic information acquired from the server. The server 500 may be located at a traffic control surveillance center for controlling traffic. For example, when traffic information is received from the server 500 via the communication unit 120 of the vehicle, the interface 130 may receive traffic information from the controller 770.

Next, the memory 140 may store a variety of data for overall operation of the parking assistance apparatus 100, such as a program for processing or control of the controller 170.

In addition, the memory 140 may store data and commands for operation of the parking assistance apparatus 100 and a plurality of application programs or applications executed in the parking assistance apparatus 100. At least some of such application programs may be downloaded from an external server through wireless communication. At least one of such application programs may be installed in the parking assistance apparatus 100 upon release, in order to provide the basic function (e.g., the driver assistance information guide function) of the parking assistance apparatus 100.

Such application programs may be stored in the memory 140 and may be executed to perform operation (or function) of the parking assistance apparatus 100 by the processor 170.

The memory 140 may store data for checking an object included in an image. For example, the memory 140 may store data for checking a predetermined object using a predetermined algorithm when the predetermined object is detected from an image of the vicinity of the vehicle acquired through the camera 160.

For example, the memory 140 may store data for checking the object using the predetermined algorithm when the predetermined algorithm such as a lane, a traffic sign, a two-wheeled vehicle and a pedestrian is included in an image acquired through the camera 160.

The memory 140 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the parking assistance apparatus 100 may operate in association with a network storage for performing a storage function of the memory 140 over the Internet.

Next, the parking assistance apparatus 100 may further include the sensor unit 155 for sensing objects located in the vicinity of the vehicle. The parking assistance apparatus 100 may include the sensor unit 155 for sensing peripheral objects and may receive the sensor information obtained by the sensing unit 155 of the vehicle via the interface 130. The acquired sensor information may be included in the information on the vehicle surrounding information.

Sensor information obtained as described above may be used for calculation of a congestion level and control for vehicle movement.

The sensor unit 155 may include at least one of a distance sensor 150 for sensing the position of an object located in the vicinity of the vehicle and a camera 160 for capturing the image of the vicinity of the vehicle.

First, the distance sensor 150 may accurately sense the position of the object located in the vicinity of the vehicle, a distance between the object and the vehicle, a movement direction of the object, etc. The distance sensor 150 may continuously measure the position of the sensed object to accurately sense change in positional relationship with the vehicle.

The distance sensor 150 may sense the object located in at least one of the front, rear, left and right areas of the vehicle. The distance sensor 150 may be provided at various positions of the vehicle.

Figure 3:
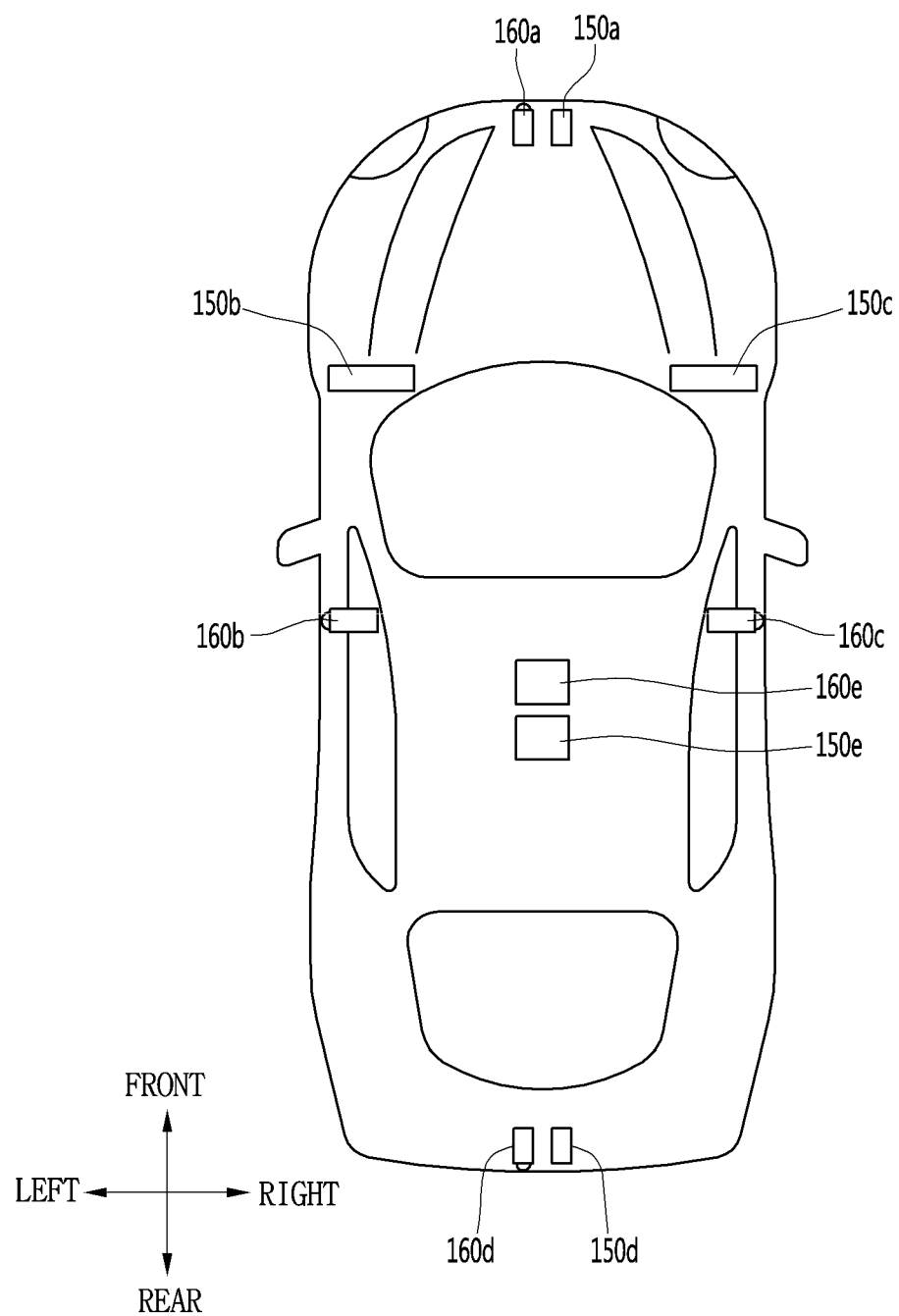
FIG. 3 is a diagram illustrating an example of a vehicle having a parking assistance apparatus according to some implementations.

In detail, referring to FIG. 3, the distance sensor 150 may be provided at at least one of the front, rear, left and right sides and ceiling of the vehicle.

The distance sensor 150 may include at least one of various distance measurement sensors such as a Lidar sensor, a laser sensor, an ultrasonic wave sensor and a stereo camera.

For example, the distance sensor 150 is a laser sensor and may accurately measure a positional relationship between the vehicle and the object using a time-of-flight (TOF) and/or a phase-shift method according to a laser signal modulation method.

Information on the object may be acquired by analyzing the image captured by the camera 160 at the processor 170.

In detail, the parking assistance apparatus 100 may capture the image of the vicinity of the vehicle using the camera 160, analyze the image of the vicinity of the vehicle using the processor 170, detect the object located in the vicinity of the vehicle, determine the attributes of the object and generate sensor information.

The image information is at least one of the type of the object, traffic signal information indicated by the object, the distance between the object and the vehicle and the position of the object and may be included in the sensor information.

In detail, the processor 170 may detect the object from the captured image via image processing, track the object, measure the distance from the object, and check the object to analyze the object, thereby generating image information.

The camera 160 may be provided at various positions.

In detail, the camera 160 may include an internal camera 160f for capturing an image of the front side of the vehicle within the vehicle and acquiring a front image.

Referring to FIG. 3, a plurality of cameras 160 may be provided at least one of the front, rear, right and left and ceiling of the vehicle.

In detail, the left camera 160b may be provided inside a case surrounding a left side mirror. Alternatively, the left camera 160b may be provided outside the case surrounding the left side mirror. Alternatively, the left camera 160b may be provided in one of a left front door, a left rear door or an outer area of a left fender.

The right camera 160c may be provided inside a case surrounding a right side mirror. Alternatively, the right camera 160c may be provided outside the case surrounding the right side mirror. Alternatively, the right camera 160c may be provided in one of a right front door, a right rear door or an outer area of a right fender.

In addition, the rear camera 160d may be provided in the vicinity of a rear license plate or a trunk switch. The front camera 160a may be provided in the vicinity of an emblem or a radiator grill.

The processor 170 may synthesize images captured in all directions and provide an around view image viewed from the top of the vehicle. Upon generating the around view image, boundary portions between the image regions occur. Such boundary portions may be subjected to image blending for natural display.

In addition, the ceiling camera 160e may be provided on the ceiling of the vehicle to capture the image of the vehicle in all directions.

The camera 160 may directly include an image sensor and an image processing module. The camera 160 may process a still image or a moving image obtained by the image sensor (e.g., CMOS or CCD). In addition, the image processing module processes the still image or the moving image acquired through the image sensor, extracts necessary image information, and delivers the extracted image information to the processor 170.

In order to enable the processor 170 to more easily perform object analysis, in the implementation, the camera 160 may be a stereo camera for capturing an image and, at the same time, measuring a distance from an object.

The sensor unit 155 may be a stereo camera including the distance sensor 150 and the camera 160. That is, the stereo camera may acquire an image and, at the same time, sense a positional relationship with the object.

Hereinafter, referring to FIGS. 4 to 6, the stereo camera and a method of detecting image information by the processor 170 using the stereo camera will be described in greater detail.

Figure 4:
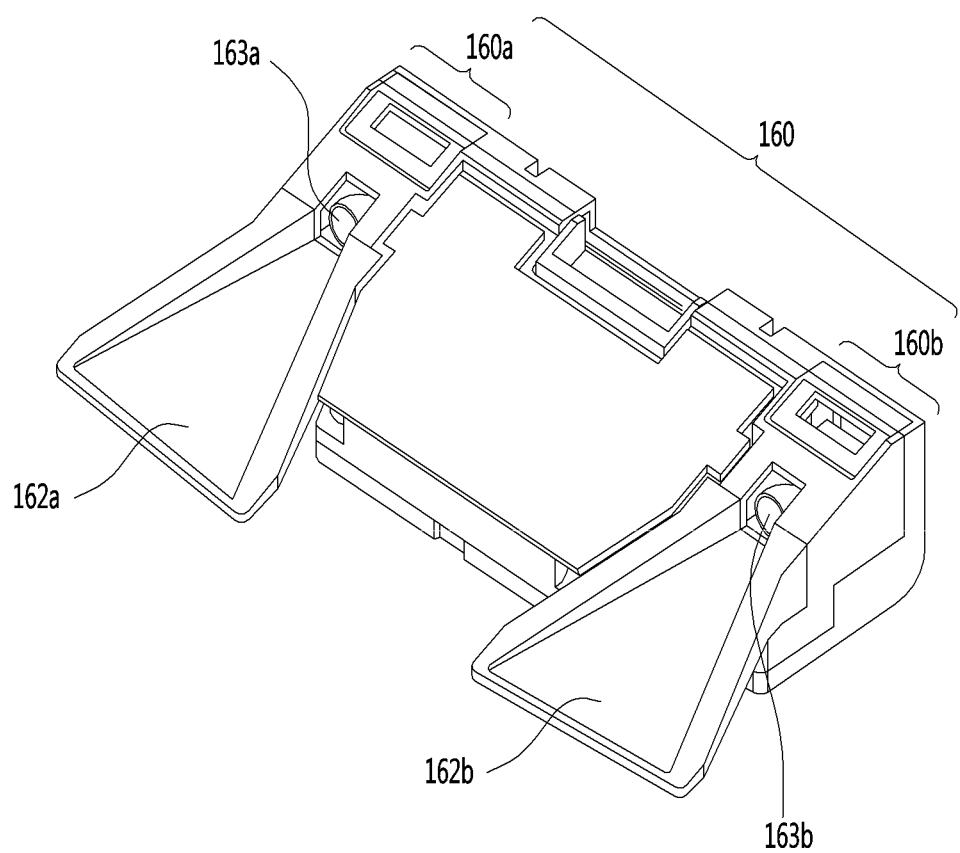
FIG. 4 is a diagram showing an example of a camera according to some implementations.

First, referring to FIG. 4, the stereo camera 160 may include a first camera 160a including a first lens 163a and a second camera 160b including a second lens 163b.

The parking assistance apparatus 100 may further include first and second light shield units 162a and 162b for shielding light incident upon the first and second lenses 163a and 163b.

The parking assistance apparatus 100 may acquire stereo images of the vicinity of the vehicle from the first and second cameras 160a and 160b, detect disparity based on the stereo images, detect an object from at least one stereo image, and continuously track movement of the object after object detection.

Figure 5:
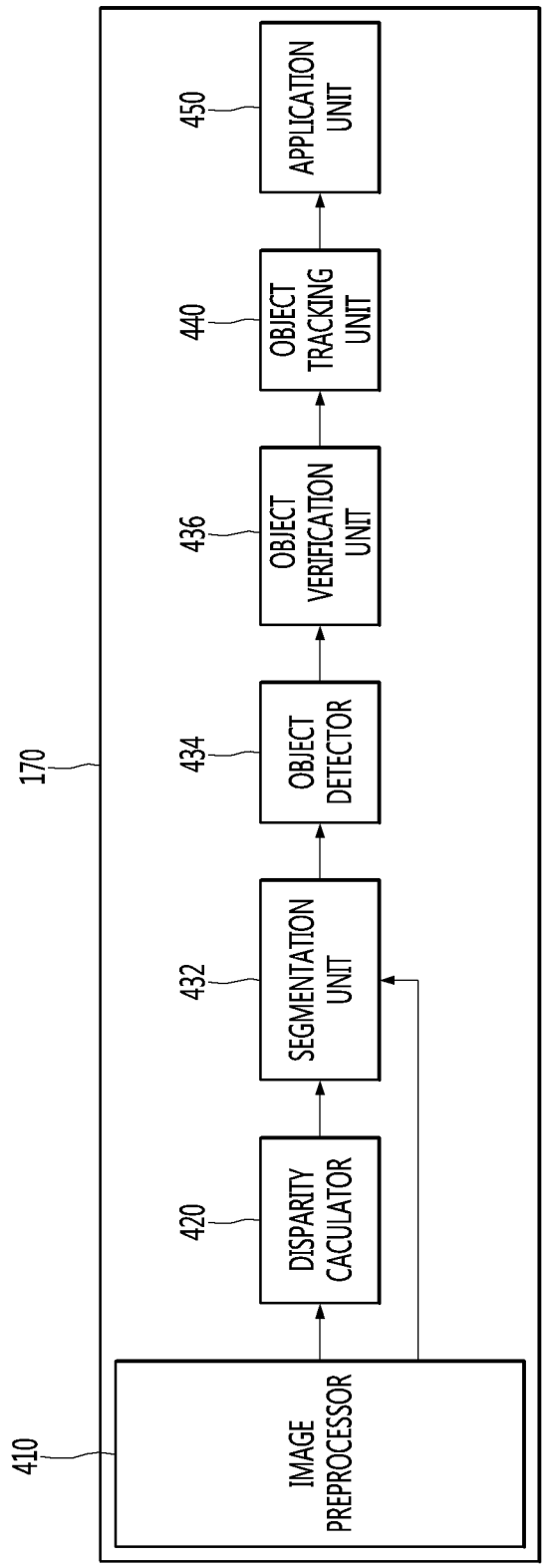
FIG. 5 is a diagram illustrating an example of at least one processor of a parking assistance apparatus according to some implementations.

Referring to FIG. 5, as one example of the block diagram of the internal configuration of the processor 170, the processor 170 of the parking assistance apparatus 100 may include an image preprocessor 410, a disparity calculator 420, an object detector 434, an object tracking unit 440 and an application unit 450. Although an image is processed in order of the image preprocessor 410, the disparity calculator 420, the object detector 434, the object tracking unit 440 and the application unit 450 in FIG. 5 and the following description, the present disclosure is not limited thereto.

The image preprocessor 410 may receive an image from the camera 160 and perform preprocessing.

In detail, the image preprocessor 410 may perform noise reduction, rectification, calibration, color enhancement, color space conversion (CSC), interpolation, camera gain control, etc. of the image. An image having definition higher than that of the stereo image captured by the camera 160 may be acquired.

The disparity calculator 420 may receive the images processed by the image preprocessor 410, perform stereo matching of the received images, and acquire a disparity map according to stereo matching. That is, disparity information of the stereo image of the front side of the vehicle may be acquired.

At this time, stereo matching may be performed in units of pixels of the stereo images or predetermined block units. The disparity map may refer to a map indicating the numerical value of binocular parallax information of the stereo images, that is, the left and right images.

The segmentation unit 432 may perform segmentation and clustering with respect to at least one image based on the disparity information from the disparity calculator 420.

In detail, the segmentation unit 432 may segment at least one stereo image into a background and a foreground based on the disparity information.

For example, an area in which the disparity information is less than or equal to a predetermined value within the disparity map may be calculated as the background and excluded. Therefore, the foreground may be segmented. As another example, an area in which the disparity information is greater than or equal to a predetermined value within the disparity map may be calculated as the foreground and extracted. Therefore, the foreground may be segmented.

The background and the foreground may be segmented based on the disparity information extracted based on the stereo images to reduce signal processing speed, the amount of processed signals, etc. upon object detection.

Next, the object detector 434 may detect the object based on the image segment from the segmentation unit 432.

That is, the object detector 434 may detect the object from at least one image based on the disparity information.

In detail, the object detector 434 may detect the object from at least one image. For example, the object may be detected from the foreground segmented by image segmentation.

Next, the object verification unit 436 may classify and verify the segmented object.

To this end, the object verification unit 436 may use an identification method using a neural network, a support vector machine (SVM) method, an identification method by AdaBoost using Haar-like features or a histograms of oriented gradients (HOG) method.

The object verification unit 436 may compare the objects stored in the memory 140 and the detected object and verify the object.

For example, the object verification unit 436 may verify a peripheral vehicle, a lane, a road surface, a traffic sign, a danger zone, a tunnel, etc. located in the vicinity of the vehicle.

The object tracking unit 440 may track the verified object. For example, the objects in the sequentially acquired stereo images may be verified, motion or motion vectors of the verified objects may be calculated and motion of the objects may be tracked based on the calculated motion or motion vectors. A peripheral vehicle, a lane, a road surface, a traffic sign, a danger zone, a tunnel, etc. located in the vicinity of the vehicle may be tracked.

Next, the application unit 450 may calculate a degree of risk, etc. based on various objects located in the vicinity of the vehicle, for example, another vehicle, a lane, a road surface, a traffic sign, etc. In addition, possibility of collision with a preceding vehicle, whether a vehicle slips, etc. may be calculated.

The application unit 450 may output a message indicating such information to the user as driver assistance information based on the calculated degree of risk, possibility of collision or slip. Alternatively, a control signal for vehicle attitude control or driving control may be generated as vehicle control information.

The image preprocessor 410, the disparity calculator 420, the segmentation unit 432, the object detector 434, the object verification unit 436, the object tracking unit 440 and the application unit 450 may be included in the image processor (see FIG. 31) of the processor 170.

In some implementations, the processor 170 may include only some of the image preprocessor 410, the disparity calculator 420, the segmentation unit 432, the object detector 434, the object verification unit 436, the object tracking unit 440 and the application unit 450. If the camera 160 includes a mono camera 160 or an around view camera 160, the disparity calculator 420 may be excluded. In some implementations, the segmentation unit 432 may be excluded.

Figure 6:
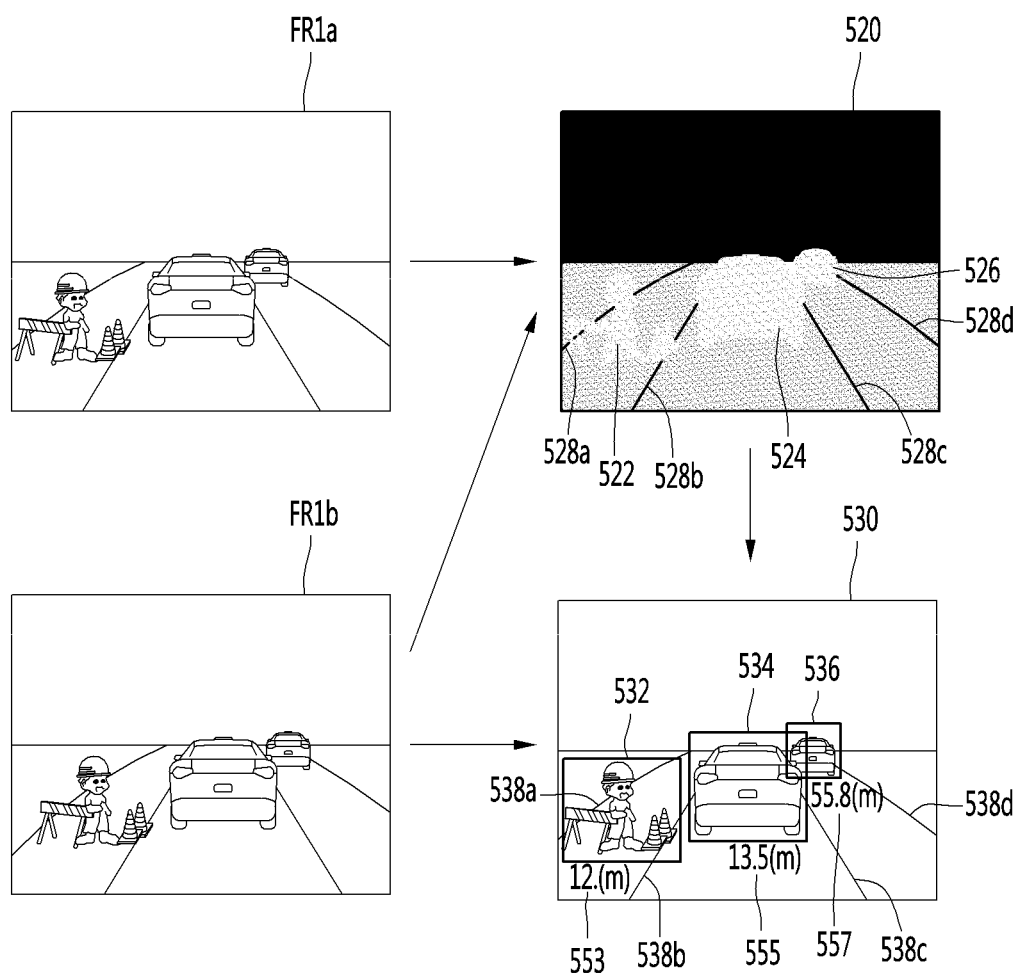
FIG. 6 is a diagram illustrating an example of generating image information from an image of a camera according to some implementations.

Referring to FIG. 6, during a first frame period, the camera 160 may acquire stereo images.

The disparity calculator 420 of the processor 170 receives stereo images FR1a and FR1b processed by the image preprocessor 410, performs stereo matching with respect to the stereo images FR1a and FR1b and acquires a disparity map 520.

The disparity map 520 indicates the levels of binocular parallax between the stereo images FR1a and FR1b. As a disparity level increases, a distance from a vehicle may decrease and, as the disparity level decreases, the distance from the vehicle may increase.

When such a disparity map is displayed, luminance may increase as the disparity level increases and decrease as the disparity level decreases.

In the figure, disparity levels respectively corresponding to first to fourth lanes 528a, 528b, 528c and 528d and disparity levels respectively corresponding to a construction area 522, a first preceding vehicle 524 and a second preceding vehicle 526 are included in the disparity map 520.

The segmentation unit 432, the object detector 434 and the object verification unit 436 may perform segmentation, object detection and object verification with respect to at least one of the stereo images FR1a and FR1b based on the disparity map 520.

In the figure, object detection and verification are performed with respect to the second stereo image FR1b using the disparity map 520.

That is, object detection and verification are performed with respect to the first to fourth lanes 538a, 538b, 538c and 538d, the construction area 532, the first preceding vehicle 534 and the second preceding vehicle 536 of the image 530.

With image processing, the parking assistance apparatus 100 may acquire various surrounding information of the vehicle, such as peripheral objects or the positions of the peripheral objects, using the sensor unit 155, as sensor information.

Next, the parking assistance apparatus 100 may further include a display unit 180 for displaying a graphic image of the parking assistance function.

The display unit 180 may include a plurality of displays.

In detail, the display unit 180 may include a first display 180a for projecting and displaying a graphic image onto and on a vehicle windshield W. That is, the first display 180a is a head up display (HUD) and may include a projection module for projecting the graphic image onto the windshield W. The graphic image projected by the projection module may have predetermined transparency. Accordingly, a user may simultaneously view the front and rear sides of the graphic image.

The graphic image may overlap the image projected onto the windshield W to achieve augmented reality (AR).

The display unit may include a second display 180b separately provided inside the vehicle to display an image of the parking assistance function.

In detail, the second display 180b may be a display of a vehicle navigation apparatus or a cluster located at an internal front side of the vehicle.

The second display 180b may include at least one selected from among a Liquid Crystal Display (LCD), a Thin Film Transistor LCD (TFT LCD), an Organic Light Emitting Diode (OLED), a flexible display, a 3D display, and an e-ink display.

The second display 180b may be combined with a touch input unit to achieve a touchscreen.

Next, the audio output unit 185 may audibly output a message for explaining the function of the parking assistance apparatus 100 and checking whether the parking assistance function is performed. That is, the parking assistance apparatus 100 may provide explanation of the function of the parking assistance apparatus 100 via visual display of the display unit 180 and audio output of the audio output unit 185.

Next, the haptic output unit may output an alarm for the parking assistance function in a haptic manner. For example, the parking assistance apparatus 100 may output vibration to the user when a warning is included in at least one of navigation information, traffic information, communication information, vehicle state information, advanced driver assistance system (ADAS) function and other driver convenience information.

The haptic output unit may provide directional vibration. For example, the haptic output unit may be provided in a steering apparatus for controlling steering to output vibration. Left or right vibration may be output according to the left and right sides of the steering apparatus to enable directional haptic output.

In addition, the power supply 190 may receive power and supply power necessary for operation of the components under control of the processor 170.

Lastly, the parking assistance apparatus 100 may include the processor 170 for controlling overall operation of the units of the parking assistance apparatus 100.

In addition, the processor 170 may control at least some of the components described with reference to FIG. 3 in order to execute the application program. Further, the processor 170 may operate by combining at least two of the components included in the parking assistance apparatus 100es, in order to execute the application program.

The processor 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, and electric units for the implementation of other functions.

The processor 170 may be controlled by the controller or may control various functions of the vehicle through the controller.

The processor 170 may control overall operation of the parking assistance apparatus 100 in addition to operation related to the application programs stored in the memory 140. The processor 170 may process signals, data, information, etc. via the above-described components or execute the application programs stored in the memory 140 to provide appropriate information or functions to the user.

Next, a process of providing the automatic parking function by controlling each element of the parking assistance apparatus 100 described above will be described in detail below.

Figure 8:
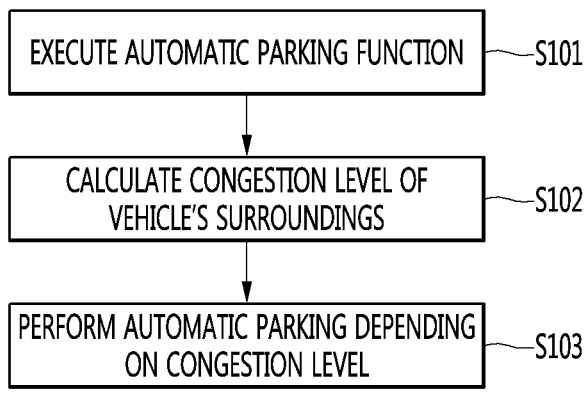
FIG. 8 is a flowchart illustrating an example of executing an automatic parking function based on a congestion level according to some implementations.

Referring to FIG. 8, the processor 170 may perform the automatic parking function when a user input for performing the automatic parking function is received from the input unit 110 (S101).

When the user input for performing the automatic parking function is received, the processor 170 may detect an object around a vehicle by controlling the sensor unit 155 to obtain object information.

Specifically, the sensor unit 155 may detect an object around the vehicle through a distance sensor 150 and/or a camera 160.

The processor 170 may obtain the object information by analyzing data sensed by the sensor unit 155.

The object information may include information about the number of objects in a monitoring region, a distance between a vehicle and an object, a type of an object, whether an object is a moving object, a speed of an object, and a movement direction of an object, and the like.

The processor 170 may calculate a congestion level of vehicle's surroundings based on object information (S102).

The congestion level is an index indicating the degree of traffic congestion and may be determined based on the number of objects existing around a vehicle, characteristics of an object, or the like.

Specifically, the processor 170 may determine a predetermined region around the vehicle as the monitoring region and calculate a congestion level of the vehicle's surroundings based on information about objects existing in the determined monitoring region.

The monitoring region may be a region within a predetermined radius from the vehicle, a region within a predetermined distance from a parking path considering a movement direction, or a region including a current position, the target parking position, and the parking path of the vehicle.

That is, the processor 170 may set a monitoring region around the vehicle in consideration of the position of the vehicle, the target parking position in which the vehicle is to be parked, the parking path and calculate the congestion level in consideration of the number of objects existing the monitoring region and the characteristics of the objects, or the like.

In addition, the processor 170 may calculate the congestion level based on, for example in proportion to, the number of objects located in the determined monitoring region.

For example, the processor 170 may classify congestion levels into at least two ranges and determine the congestion level based on whether the number of the objects in the monitoring region is equal to or greater or less than a predetermined number based on the predetermined number In this case, the processor 170 may calculate a congestion level by assigning a weight value depending on the characteristics of the object In this case, the characteristics of the object may be a distance between the current position of the vehicle and the object, a distance between the parking path and the object, whether the object is a moving or fixed object, a type of the object, the speed of the object, or the movement direction of the object.

For example, the processor 170 may assign a larger weight value as a distance between the vehicle and the object is shorter to calculate the congestion level.

Also, the processor 170 may assign a large weight value when the object is a moving object to calculate a congestion level.

Also, the processor 170 may assign a weight value according to a movement speed and a movement direction of the object.

Specifically, a larger weight value may be assigned as the movement speed of the object is higher, and a larger weight value may be assigned as the object moves closer to the parking path.

In some implementations, the processor 170 may detect a type of the object by performing a machine learning operation, such as deep learning, on one or more images of the object, for example, images of the object that were captured by an imaging device of the vehicle. The processor 170 may then calculate a congestion level by assigning a weight value according to the type of the object that was learned from the one or more images.

As such, in some implementations, the processor 170 may precisely calculate the congestion level of the vehicle's surroundings by assigning a weight value to each object in consideration of the characteristics of the object, rather than merely calculate the congestion level based only on the number of objects within the monitoring region.

In this case, the processor 170 may display the calculated congestion level or automatic parking information, such as a time required for automatic parking, which is calculated based on the congestion level.

Also, the processor 170 may update the congestion level by periodically the congestion level during automatic parking and perform the automatic parking function in different manners depending on the updated congestion level in real time.

When the congestion level is calculated, the processor 170 may perform control such that the vehicle moves to the target parking position based on the congestion level of the vehicle's surroundings, performing the automatic parking function (S103).

Specifically, the processor 170 perform the automatic parking function in different manners depending on the calculated congestion level, so that the vehicle can be automatically parked at a high speed in a comfort environment in which the congestion level is low, and the vehicle can be automatically parked in safe and without frequent stop in a congested environment in which the congestion level is high.

The processor 170 sets a boundary range of the vehicle, a movement speed, a parking path, and/or a parking method depending on the congestion level and performs the automatic parking function according to settings, allowing the automatic parking function to be smoothly performed in the congested environment.

Specifically, the processor 170 sets the vehicle boundary range based on which the vehicle control braking operation depending on the congestion level and perform the automatic parking function based on the set vehicle boundary range. The boundary range may be, for example, a range within which the vehicle is controlled to travel during the automatic parking function.

For example, the processor 170 may set a size of the vehicle boundary range to be smaller as the congestion level increases and set the size of the vehicle boundary range to be larger as the congestion level decreases.

Therefore, in the congested situation, the vehicle may be controlled to travel within a smaller vehicle boundary range that avoids nearby objects, thus allowing the vehicle to be moved without stopping, even when objects are located adjacent to the vehicle.

On the other hand, in an environment in which the congestion level is low, the vehicle may be controlled to travel within a larger vehicle boundary range, thus providing more room for the vehicle to travel, while also allowing the vehicle to be stopped when an object moves adjacent to the vehicle.

As such, the processor 170 may reduce the size of the vehicle boundary range in the congested environment to prevent frequent stopping of the vehicle, thus smoothly performing the automatic parking function.

In this case, for safety, the processor 170 may set a movement speed of the vehicle during automatic parking according to the vehicle boundary range.

Since the vehicle boundary range is determined depending on the congestion level, it may be considered that the movement speed of the vehicle is determined depending on the congestion level.

Specifically, the processor 170 may perform control such that the vehicle is moved at a lower speed as the size of the vehicle boundary range is smaller, and perform control such that the vehicle is moved at a higher speed as the size of the vehicle boundary range is larger.

That is, when the congestion level is high, the processor 170 may reduce the size of the vehicle boundary range to prevent frequent stopping of the vehicle and perform control such that the vehicle is moved at a low speed for safety, thus performing the automatic parking function smoothly even when the vehicle's surroundings is congested.

On the other hand, the processor 170 may expand the vehicle boundary range while moving the vehicle at a high speed when the congestion level is low, thus allowing the vehicle to be parked safely and rapidly in a comfort environment.

In this case, the processor 170 may control the display unit 180 to display automatic parking information about the vehicle boundary range, the movement speed of the vehicle, and the like as a graphic image, thus enhancing convenience of a user.

On the other hand, the processor 170 may design a parking path for directing the vehicle to a target parking position according to the congestion level.

Specifically, the processor 170 may reduce a distance to a maximum movement position in the parking path when the congestion level is high. The maximum movement position refers to a position farthest from a current position of the vehicle in the designed parking path.

For example, in some implementations, a parking path may include a plurality of turns at which the vehicle performs a turning movement. Between each turn, the vehicle may travel with a fixed steering direction, or fixed direction in which wheels of the vehicle are steered. In such scenarios, the distance that the vehicle travels between each turn may be limited to be less than the maximum movement position.

As such, by limiting the maximum movement position, the processor 170 may move the vehicle within a limited radius or limited range of travel to reduce interference with surrounding objects.

In order to move the vehicle in the small radius as possible, the processor 170 may design a parking path in which the number of times of turning is increased as the congestion level is higher.

In this case, the number of times of turning refers to the number of times of turning of vehicle from forward movement to reverse movement or from reverse movement to forward movement.

In some implementations, the processor 170 may design a parking path in which the number of times of turning is increased by setting a parking path making the maximum movement distance of the vehicle short.

Also, the processor 170 may design another parking path in which a parking method is different depending on the congestion level, Specifically, the processor 170 may determine a parking method, such as a forward parking method, a reverse parking method, a parallel parking method, a perpendicular parking method, and the like in order to reduce interference with an object and design a parking path in which the maximum movement distance is small.

In some implementations, the processor 170 may design an optimal parking path depending on the congestion level to maximally reduce interference with an object during parking of the vehicle, preventing frequent stopping of the vehicle and smoothly executing the automatic parking function even when the vehicle's surroundings are congested.

On the other hand, the processor 170 may control the display unit 180 to display the calculated parking path through a graphic image.

Since calculation of the congestion level is performed in real time, when the congestion level is changed, and the parking path is redesigned, the existing parking path is deleted and a newly-designed parking path is displayed.

As described above, the processor 170 may execute the automatic parking function in different manners depending on the congestion level, thus providing an optimal automatic parking function depending on a congested environment and a comfort environment.

Next, a method of calculating a congestion level in the processor 170 will be described in detail below with reference to drawings.

Figure 9:
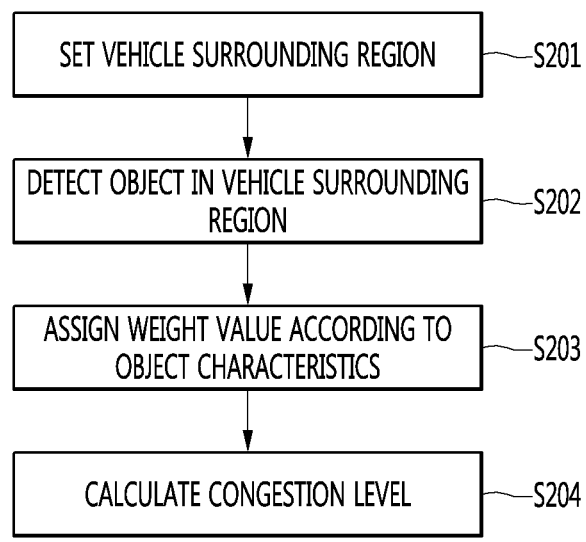
FIG. 9 is a flowchart illustrating an example of calculating a congestion level in a parking assistance apparatus according to some implementations.

Referring to FIG. 9, the processor 170 may set a monitoring region around the vehicle, which is a criterion for calculating the congestion level (S201).

Specifically, the processor 170 may determine a predetermined region around the vehicle as the monitoring region and calculate a congestion level of the vehicle's surroundings based on information about objects existing in the determined monitoring region.

The monitoring region may be a region within a predetermined radius from the vehicle, a region within a predetermined distance from a parking path considering a movement direction, or a region including a current position, the target parking position, and the parking path of the vehicle.

Figure 10:
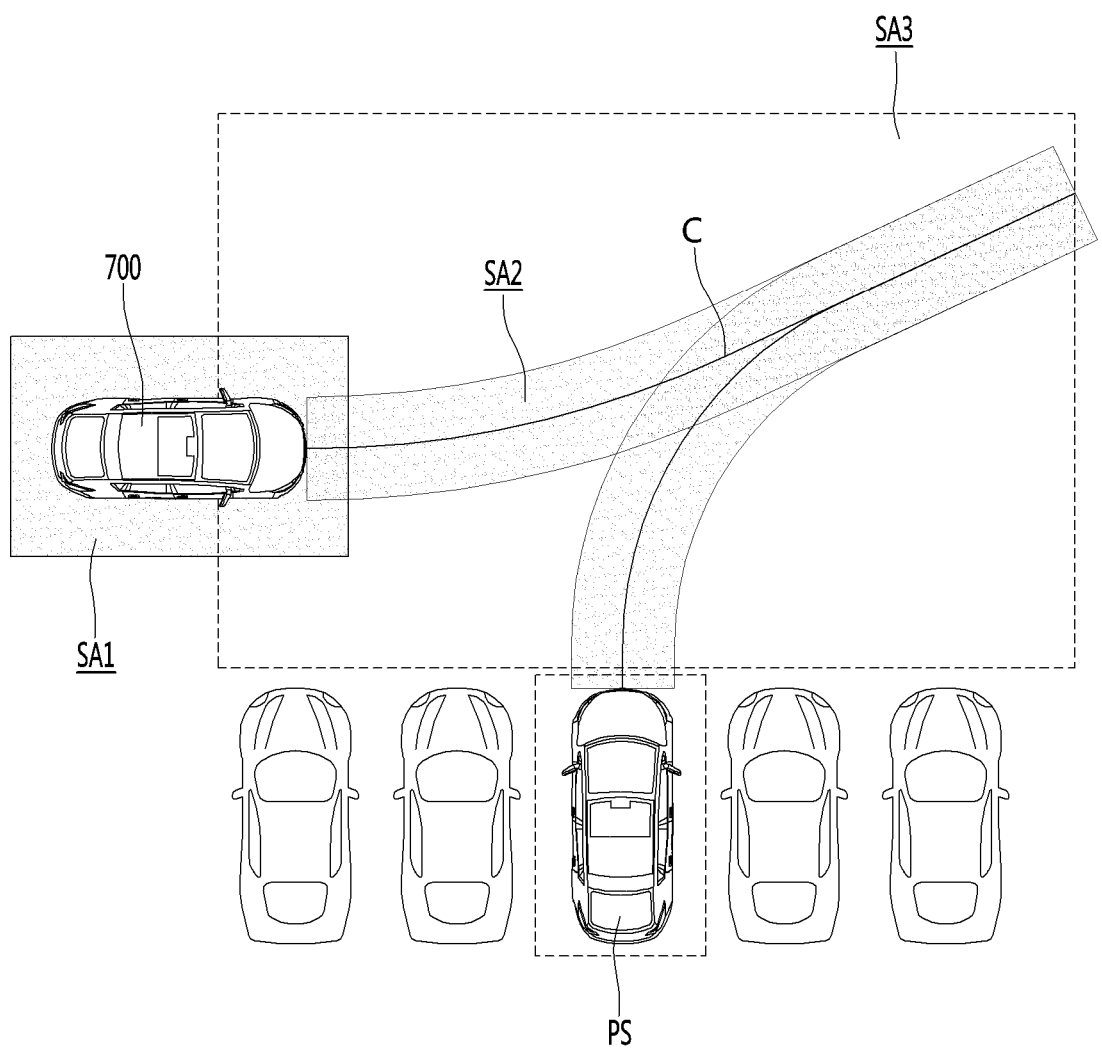
FIG. 10 is a diagram illustrating an example of setting a monitoring region around a vehicle according to some implementations.

For example, referring to FIG. 10, the monitoring region SA may be a first monitoring region SA1 that is a region within a predetermined radius from the vehicle.

Also, the monitoring region SA may be a second monitoring region SA2 that is a region within a predetermined radius from the parking path C of the vehicle.

Also, the monitoring region SA may be a third monitoring region SA3 including the parking path C based on the current position of the vehicle and the target parking position.

In some implementations, the monitoring region SA may be a region sensed by the sensor unit 155.

As described above, the processor 170 may determine the congestion level based on only objects located in a region to be occupied by the vehicle during automatic parking.

Thereafter, the processor 170 may detect objects to be interference in the monitoring region SA around the vehicle based on object information (S202).

In addition, the processor 170 may calculate the congestion level based on, for example in proportion to, the number of objects which are deemed to interfere with parking in the determined monitoring region For example, the processor 170 may classify congestion levels into at least two ranges and determine the congestion level based on whether the number of the objects in the monitoring region SA is equal to or greater or less than a predetermined number based on the predetermined number.

In some implementations, the processor 170 may simply calculate the congestion level according to the number of objects within the monitoring region SA.

For example, the processor 170 may set the congestion level to a first level when the number of objects is less than a first predetermined number, set the congestion level to a second level when the number of objects is greater than the first predetermined number and less than a second predetermined number, and set the congestion level to a third level when the number of objects is greater than the second predetermined number.

The processor 170 may calculate a congestion level by assigning a weight value depending on the object characteristics (S203 and S204).

First, the processor 170 may obtain object information about objects in the monitoring region SA by analyzing data sensed by the sensor unit 155.

The object information may include information about the number of objects in a monitoring region SA, a distance between a vehicle and an object, a type of an object, whether an object is moving object, a speed of an object, and a movement direction of an object, and the like.

In this case, the characteristics of the object may be a distance between the current position of the vehicle and the object, a distance between the parking path C and the object, whether the object is a moving or fixed object, a type of the object, the speed of the object, or the movement direction of the object.

The processor 170 may assign a weight value to each object based on the obtained object characteristics and calculate a congestion level by multiplying each of objects by its weight value and adding multiplication results.

For example, the processor 170 may set a boundary range of an object based on characteristics of the object, detect an overlap region between the boundary region and the monitoring region SA, and calculate the congestion level as a function of, for example in proportion to, the overlap region.

In addition, the processor 170 may assign a weight value to each object in such a way that its boundary region is set differently depending on the object characteristics.

Specifically, the processor 170 may assign a large weight value as the object is a moving object, and assign a weight value according to a movement speed and a movement direction of the object.

Figure 11:
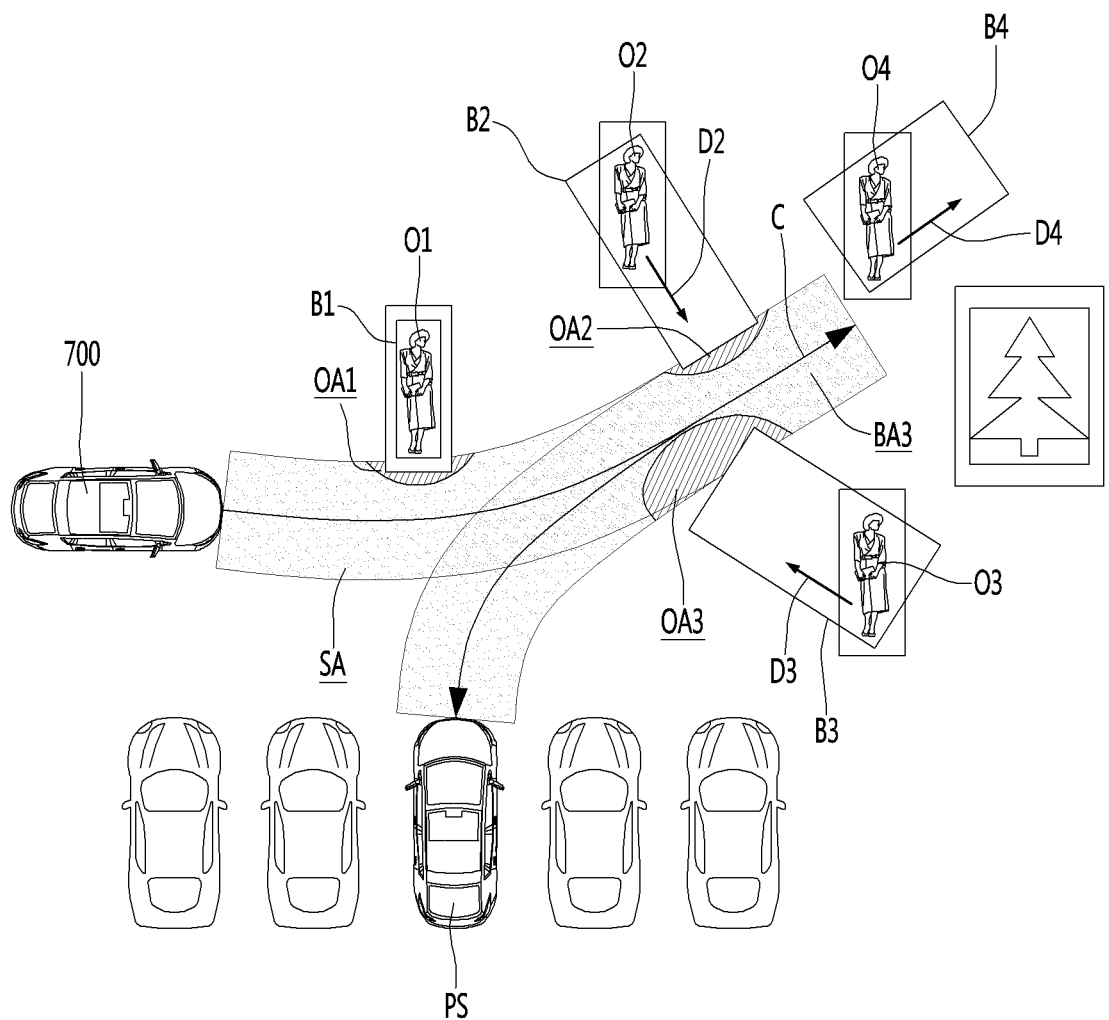
FIG. 11 is a diagram illustrating an example of setting a boundary region of an object according to object characteristics according to some implementations.

For example, referring to FIG. 11, since the first object O1 is a fixed object, a region within a predetermined radius from the object may be set to a first boundary region B1 of the first object O1.

On the other hand, since a second object O2 is an object moving toward the monitoring region SA, a second boundary region B2 of the second object O2 is set to be expanded based on the movement direction and speed of the second object O2.

Since the overlap region OA with the monitoring region SA is expanded as the boundary region is expanded, it may be understood that a weight value has been assigned.

Also, since an expansion direction matches the movement direction of the object, it may be understood that a weight value has been assigned to the movement direction.

For example, since a fourth movement direction D4 of a fourth object O4 is not related with the monitoring region SA, it may be considered that a weight value is small.

Also, the processor 170 may assign a larger weight value as a distance between the vehicle and the object is shorter to calculate the congestion level. For example, the congestion level by the first object O1 may be larger than the congestion level by the second object O2.

In some implementations, the processor 170 may detect a type of the object by performing a machine learning operation, such as deep learning, on one or more images of the object, for example images of the object that were captured by an imaging device of the vehicle. The processor 170 may then calculate a congestion level by assigning a weight value according to the type of the object that was learned from the one or more images.

For example, the processor 170 may determine whether a type of the object is a person, a motorcycle, a vehicle, an adult, or a child by performing image processing of a vehicle surrounding image, and assign a weight value differently depending on the type to calculate the congestion level.

In some scenarios, when the third object O3 is a child, the calculated congestion level associated with the third object O3 may be larger than the calculated congestion level associated with the second object O2 that is an adult.

As such, in some implementations, the processor 170 may precisely calculate a congestion level of the vehicle's surrounds by assigning a weight value to each object in consideration of the object characteristics, rather than calculating a congestion level only based on the number of objects within the monitoring region SA.

In this case, the processor 170 may display the calculated congestion level or automatic parking information, such as a time required for automatic parking, which is calculated based on the congestion level.

In some implementations, the processor 170 may calculate a time required for automatic parking to be an increasing function of the congestion level, such as proportional to the congestion level. The processor 170 may then control the display unit 180 to display the calculated congestion level and the time required for automatic parking.

Figure 12A:
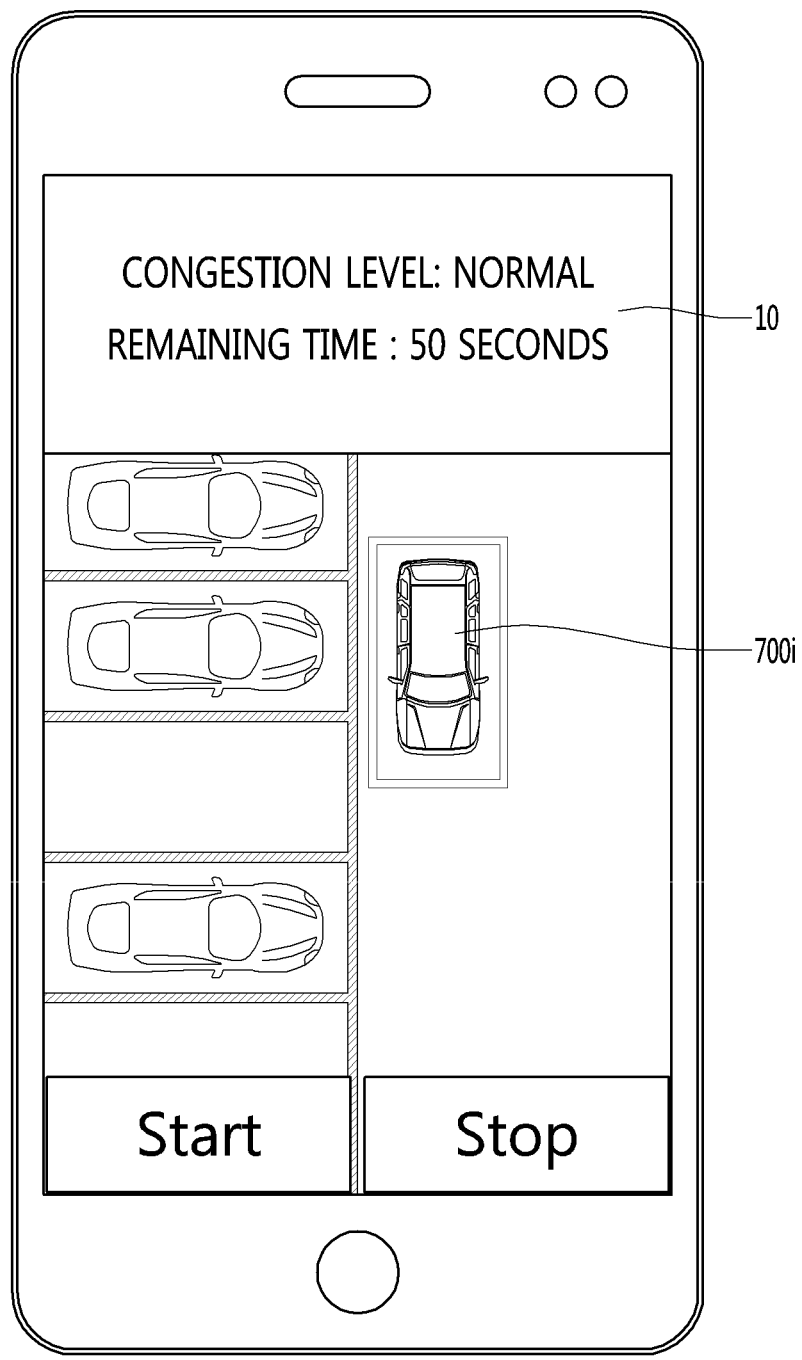
FIGS. 12A to 12F are examples of user interfaces of a display unit for an automatic parking function executed based on a congestion level according to some implementations.

For example, referring to FIG. 12A, when the congestion level is normal, the display unit 180 may display a 10-th graphic image 10 indicating the congestion level and the time required for automatic parking calculated based on the congestion level and the vehicle surrounding image during execution of the automatic parking function.

Figure 12B:
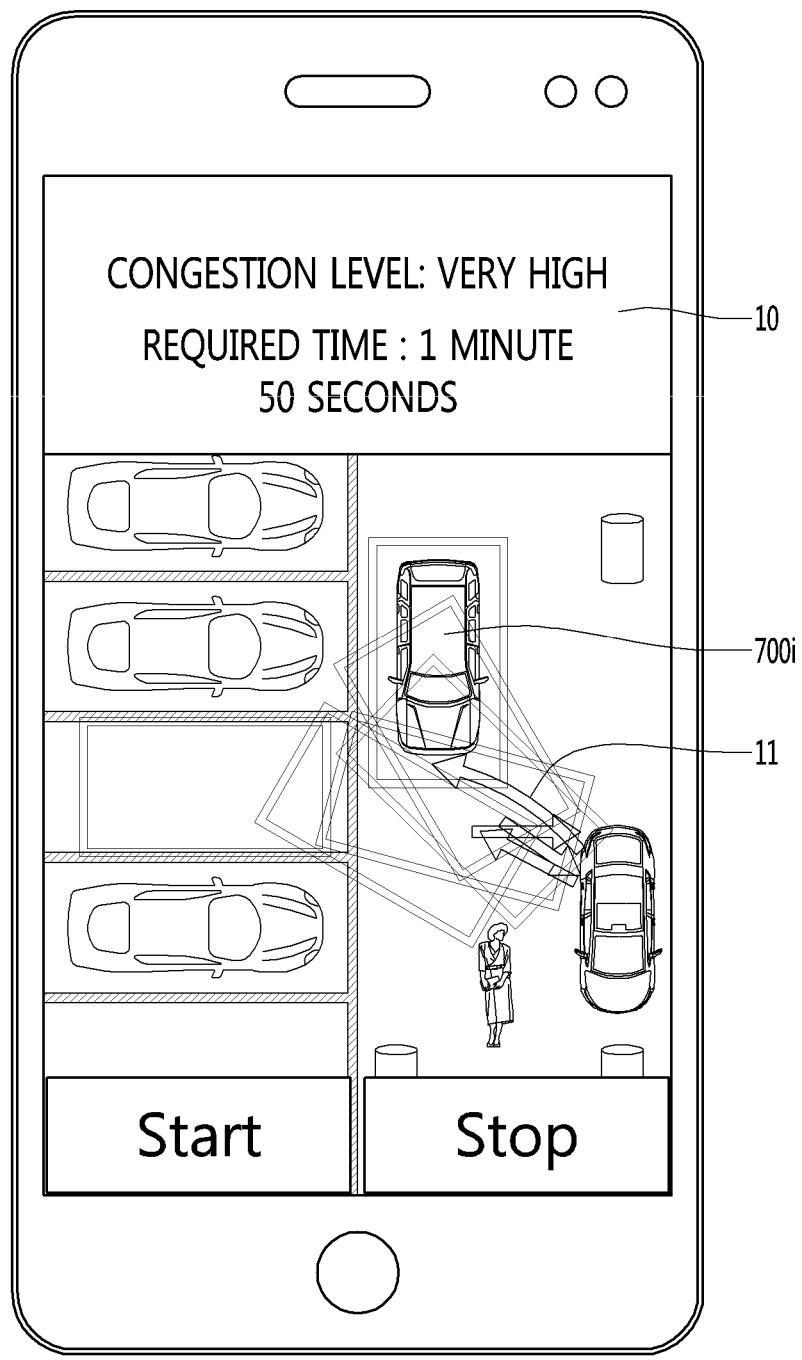

For example, referring to FIG. 12B, when the congestion level is high, the display unit 180 may display a 10-th graphic image 10 indicating the congestion level and the time required for automatic parking calculated based on the congestion level, an 11-th graphic image 11 indicating a parking path redesigned according to a change in congestion level, and the vehicle surrounding image during execution of the automatic parking function.

As such, in some implementations, the processor 170 measures the congestion level in real time, and when the congestion level increases, controls the display unit 180 to display the increased time required for automatic parking, thus enhancing user convenience.

Figure 12C:
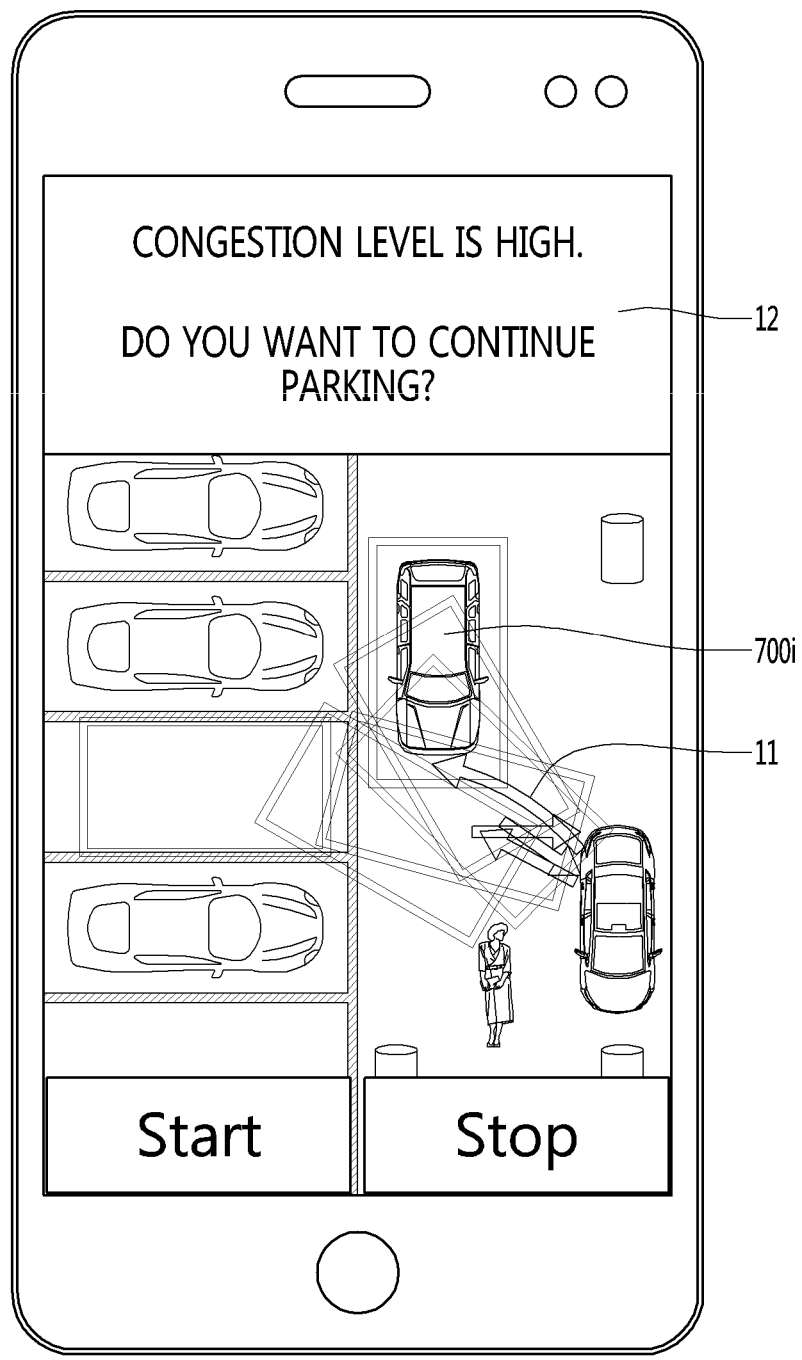

Referring to FIG. 12C, when the congestion level is equal to or greater than a predetermined value, the display unit 180 may display a 12-th graphic image 12 for inquiring of a user about whether to stop the automatic parking function for safety.

The processor 170 may control the display unit 180 to display characteristics of the objects included in the vehicle surrounding image.

Figure 12D:
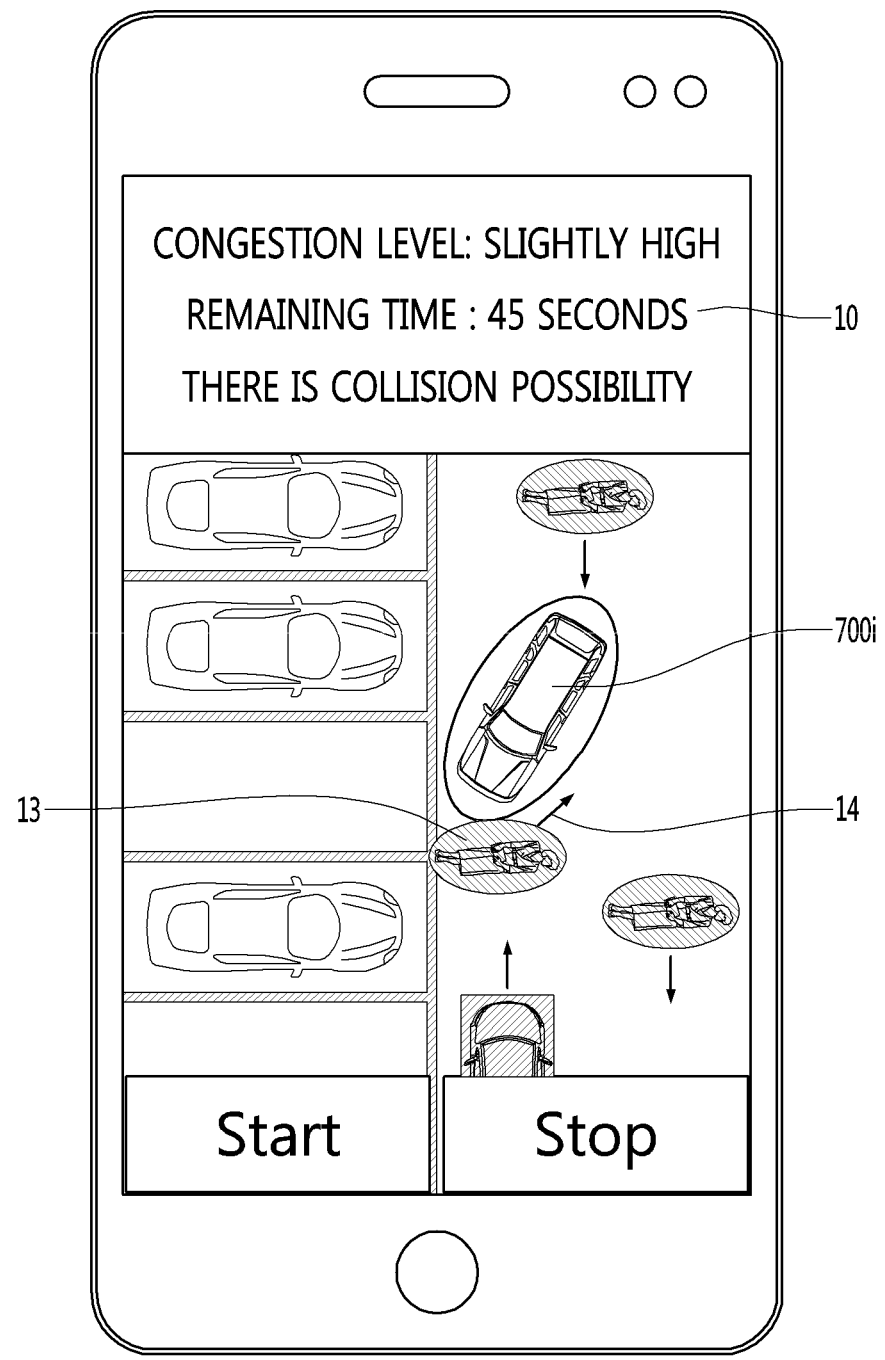

Referring to FIG. 12D, the display unit 180 may further display a 13-th graphic image indicating a boundary region of an object and a 14-th graphic image indicating a movement direction of the object, thus informing risk of collision with the object.

Figure 12E:
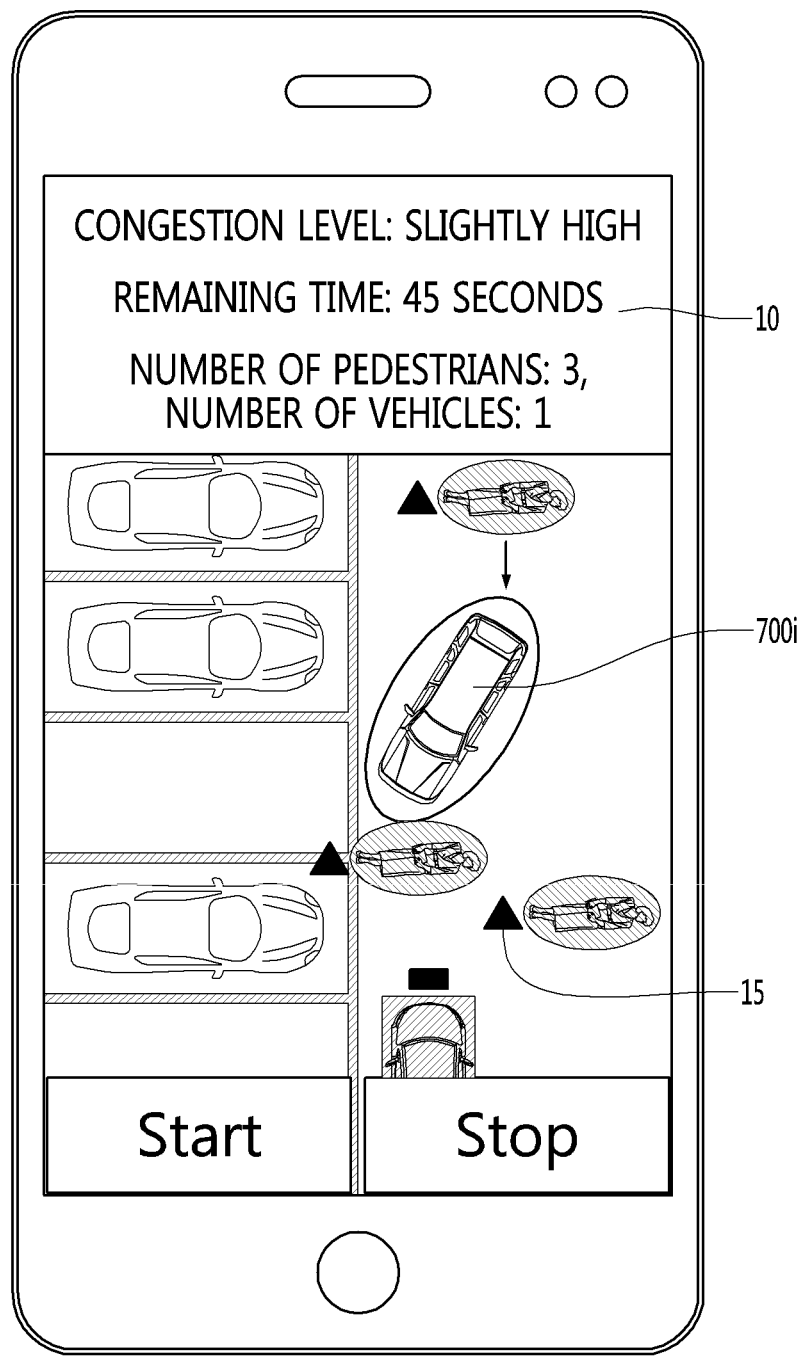
Figure 12F:
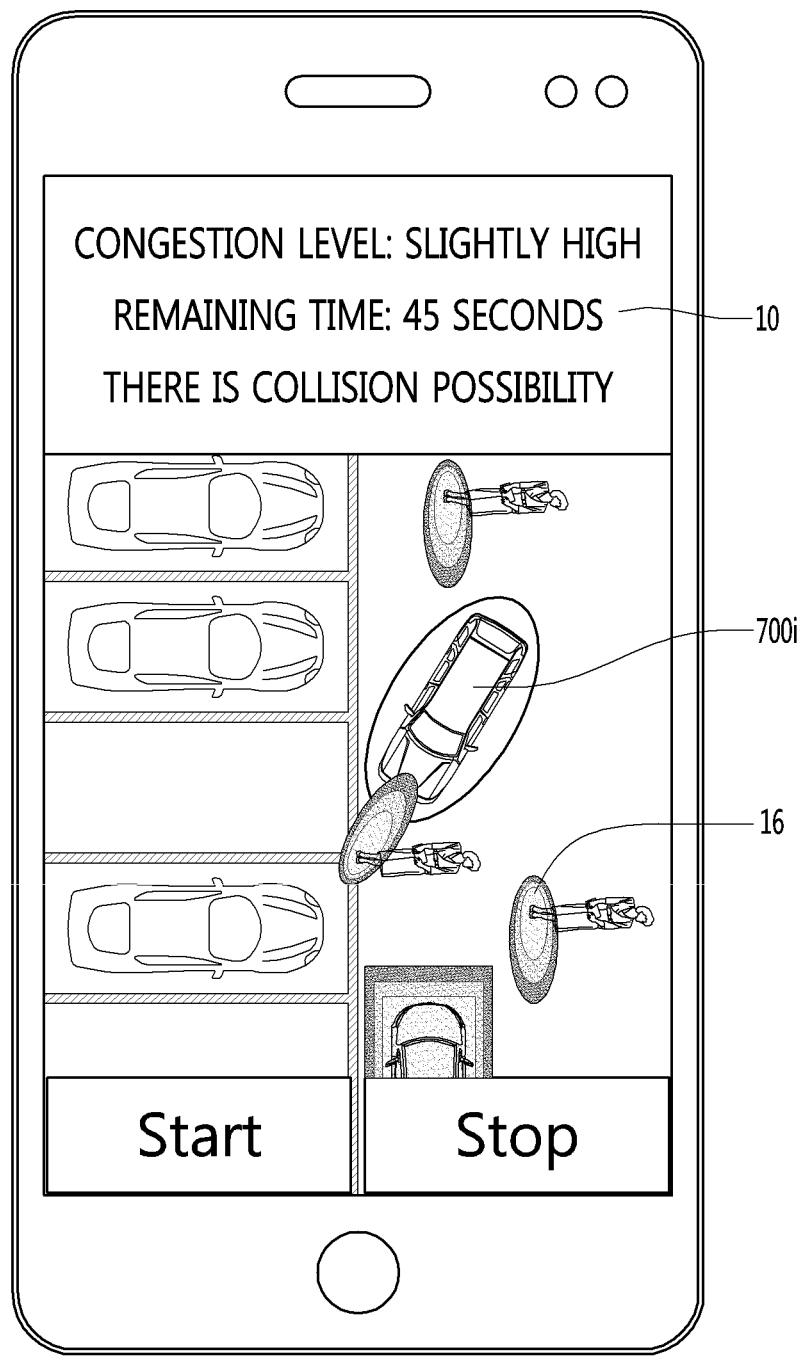

Referring to FIG. 12E, the display unit 180 may further display a 15-th graphic image 15 indicating a degree of risk according to a type of the object.

Also, the display unit 180 may further display the number of objects and the position of the object to inform the congestion level of the vehicle's surroundings indirectly.

Referring to FIG. 12D, the display unit 180 may display a 16-th graphic image 16 indicating the boundary region of the object in the form of a contour in consideration of the speed and movement direction of the object, thus allowing the user to perceive risk of collision between the object and the vehicle intuitively.

A process of performing an automatic parking function based on the congestion level calculated as described above in the parking assistance apparatus 100 will be described below in detail.

Figure 13:
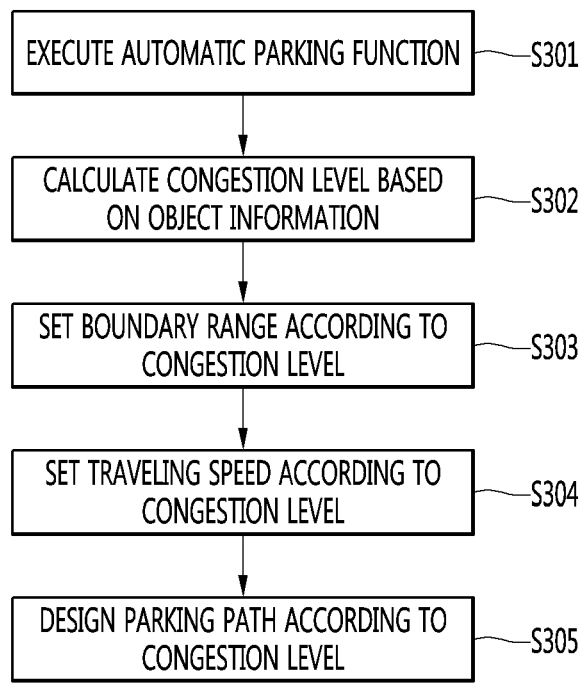
FIG. 13 is a flowchart illustrating an example of calculating a congestion level and executing an automatic parking function based on the congestion level according to some implementations.

Referring to FIG. 13, when a user executes the automatic parking function through the input unit 110, the parking assistance apparatus 100 may execute the automatic parking function (S301).

Specifically, when the user input for executing the automatic parking function is received, the processor 170 may detect an object around a vehicle by controlling the sensor unit 155 to obtain object information.

The processor 170 may calculate the congestion level according to the obtained object information (S302).

When the congestion level is calculated, the processor 170 may perform control such that the vehicle moves to the target parking position based on the congestion level of the vehicle's surroundings, performing the automatic parking function.

Specifically, the processor 170 perform the automatic parking function in different manners depending on the calculated congestion level, so that the vehicle can be automatically parked at a high speed in a comfort environment in which the congestion level is low, and the vehicle can be automatically parked in safe and without frequent stop in a congested environment in which the congestion level is high.

The processor 170 may set a boundary range and a movement speed of the vehicle, a parking path C, and/or a parking method based on the congestion level and execute the automatic parking function according to the settings, thus executing the automatic parking function smoothly even in a congested environment.

Specifically, the processor 170 sets the vehicle boundary range based on which the vehicle control braking operation depending on the congestion level and perform the automatic parking function based on the set vehicle boundary range (S303).

Specifically, the processor 170 may set a size of the vehicle boundary range to be smaller as the congestion level increases and set the size of the vehicle boundary range to be larger as the congestion level decreases.

Therefore, in the congested situation, it is possible to move the vehicle in the vehicle boundary range set to be small to allow the vehicle to be moved without stopping the vehicle even when an object is located adjacent to the vehicle.

On the other hand, in an environment in which the congestion level is low, it is possible to move the vehicle in the vehicle boundary range set to be large to allow the movement of the vehicle to be stopped when an object moves adjacent to the vehicle.

As such, in some implementations, the processor 170 may reduce the size of the vehicle boundary range in the congested environment to prevent frequent stopping of the vehicle, thus smoothly performing the automatic parking function.

In this case, for safety, the processor 170 may set a movement speed of the vehicle during automatic parking according to the vehicle boundary range.

Since the vehicle boundary range is determined depending on the congestion level, it may be considered that the movement speed of the vehicle is determined depending on the congestion level.

Specifically, the processor 170 may perform control such that the vehicle is moved at a lower speed as the size of the vehicle boundary range is smaller, and perform control such that the vehicle is moved at a higher speed as the size of the vehicle boundary range is larger.

As such, in some implementations, when the congestion level is high, the processor 170 may reduce the size of the vehicle boundary range to prevent frequent stopping of the vehicle and perform control such that the vehicle is moved at a low speed for safety, thus performing the automatic parking function smoothly even when the vehicle's surroundings is congested.

On the other hand, the processor 170 may expand the vehicle boundary range while moving the vehicle at a high speed when the congestion level is low, thus allowing the vehicle to be parked safely and rapidly in a comfort environment.

Figure 14A:
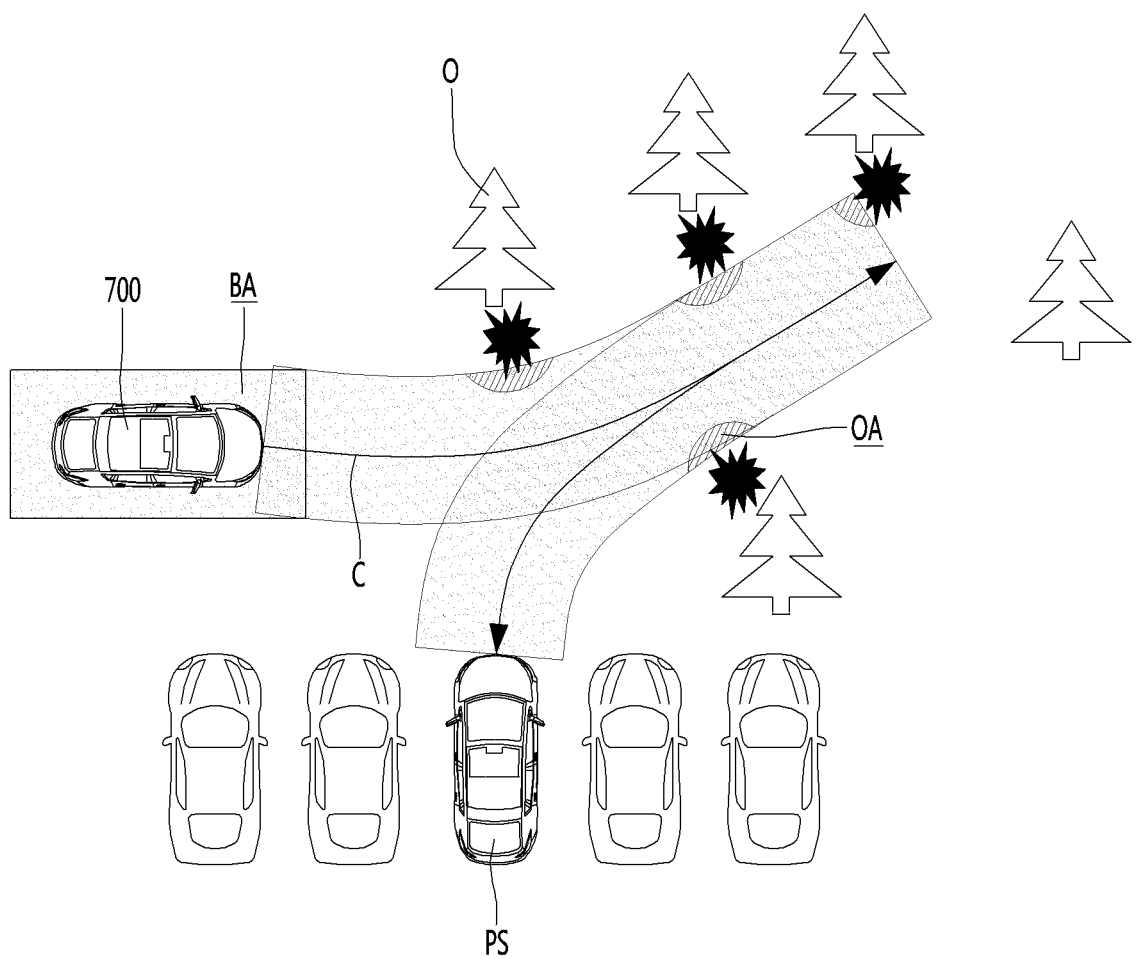
FIG. 14A is a diagram illustrating an example of a scenario in which a basic vehicle boundary range and a boundary region of an object overlap each other.

Referring to FIG. 14A, when the vehicle travels in a general boundary range BA in a situation in which the vehicle's surroundings is congested, there may exist a plurality of regions (OA) in which the boundary region of the object and the boundary region BA of the vehicle overlap each other. In such scenarios, the movement of the vehicle may be stopped numerous times and the parking path C may be frequently changed, leading to non-smooth automatic parking.

Although the boundary range BA in FIG. 14A is shown with a rectangular outline, implementations are not limited to any particular shape. In general, the boundary range may be any suitable region around the vehicle that defines a range within which the vehicle is controlled to travel during the automatic parking function.

Figure 14B:
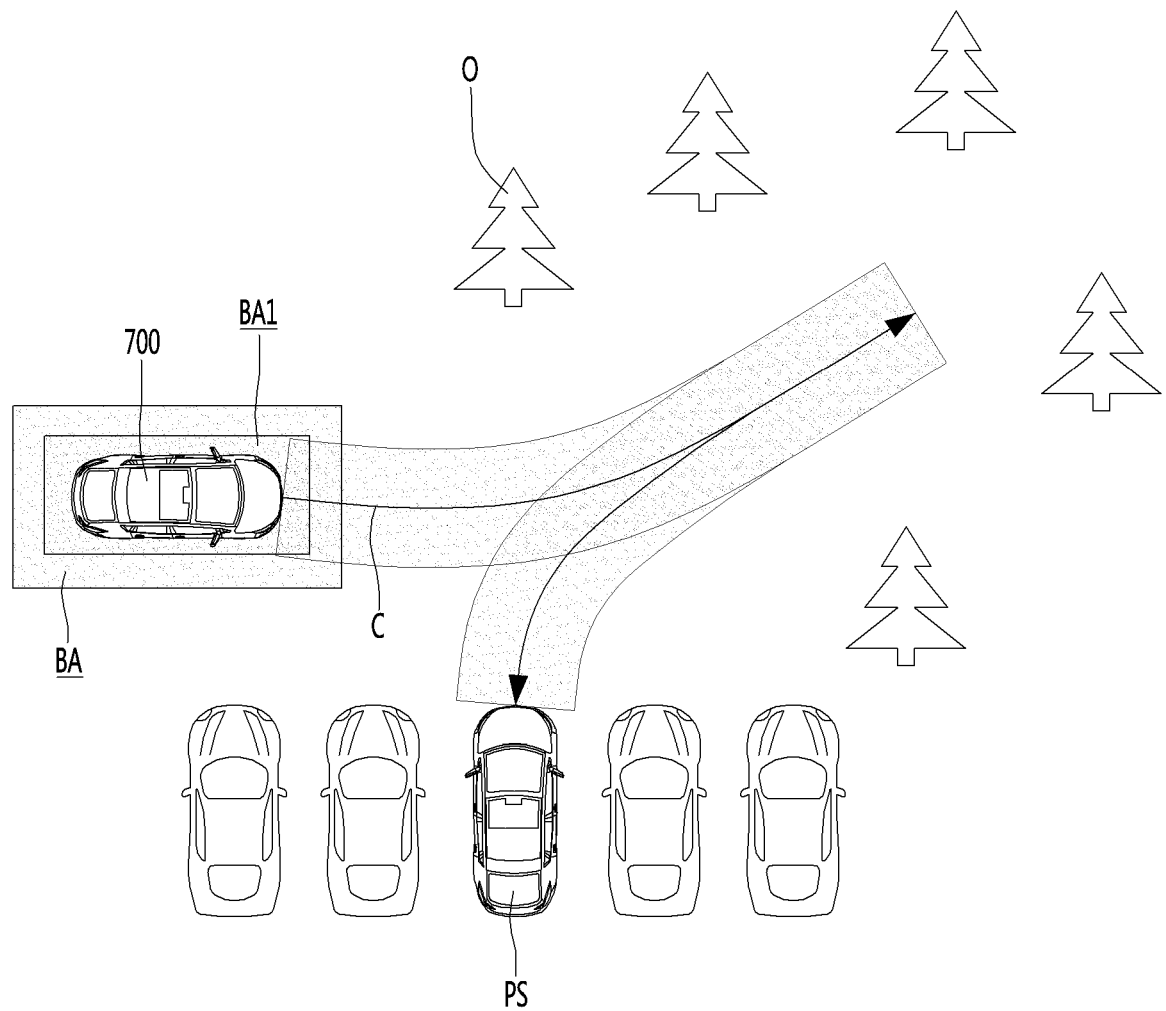
FIG. 14B is a diagram illustrating an example of a vehicle boundary range reset based on the overlap region.

Referring to FIG. 14B, when the congestion level of the vehicle's surroundings is high, the parking assistance apparatus 100 may reduce a size of the vehicle boundary range BA to instead be a first boundary range BA1, thus reducing the overlap region OA between the boundary range of the object and the boundary range BA of the vehicle. This may help prevent frequent stopping during the automatic parking. In such scenarios with a smaller boundary range BA1, the parking assistance apparatus may control the vehicle to move at a lower speed, so safely maintain control within the smaller boundary range BA1.

Figure 14C:
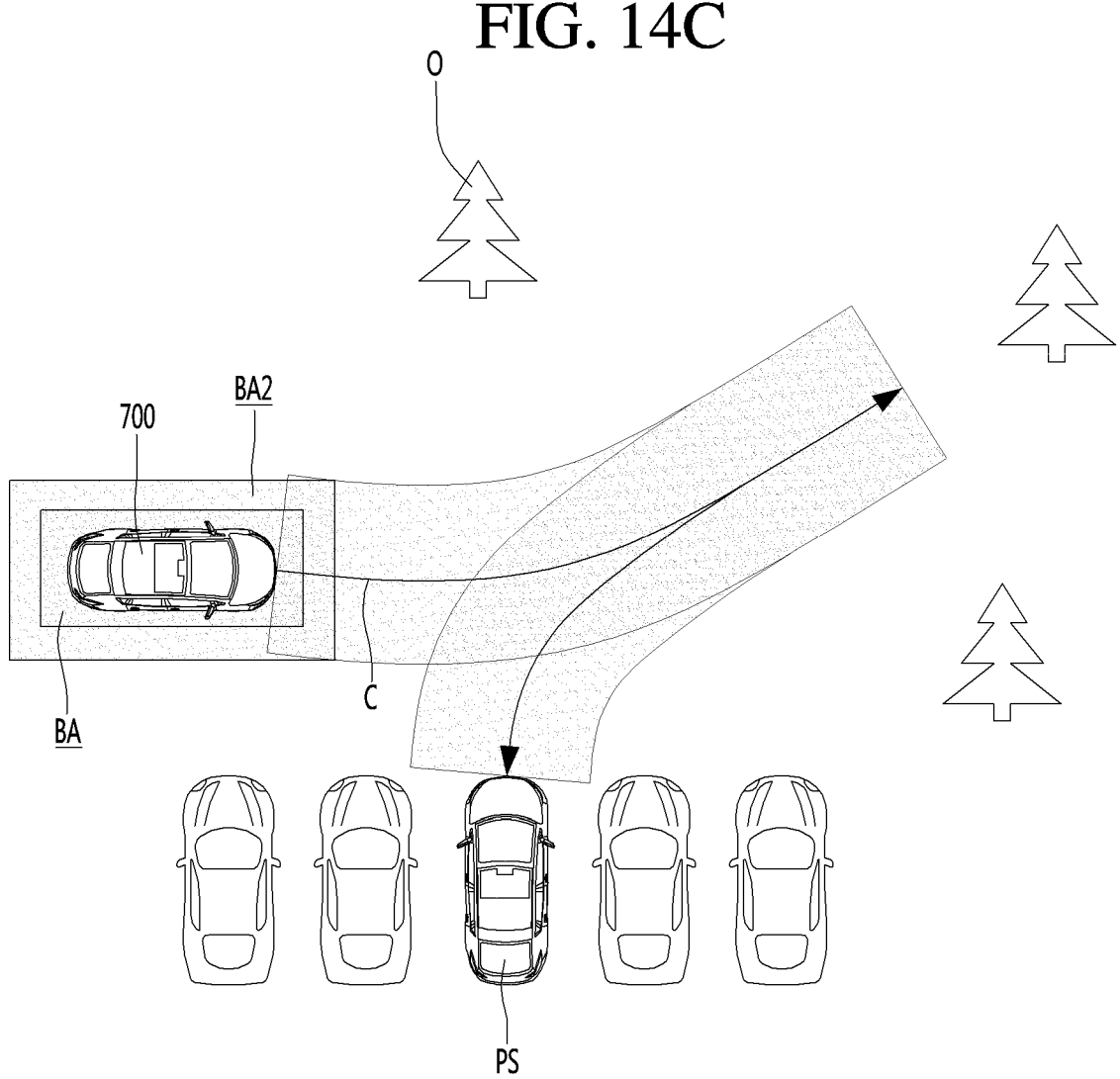
FIG. 14C is a diagram illustrating an example of an expanded vehicle boundary range.

On the other hand, referring to FIG. 14C, the parking assistance apparatus 100 may expand a size of the vehicle boundary range BA to instead be a second boundary range BA2 when the congestion level of the vehicle's surroundings is low. In such scenarios with larger boundary range BA2, the parking assistance apparatus 100 may control the vehicle to move at a higher speed, thus achieving safe and rapid automatic parking within the larger boundary range BA2.

The size of the boundary range of the vehicle may refer to any suitable measure of a size through which the vehicle travels, such as a width of the boundary range. The size may refer to a fixed size in a scenario where the boundary range has constant size in different portions of the boundary range, or may refer to a range of sizes in a scenario in which the boundary range has a size that varies within a given range of sizes at different portions of the boundary range. The sizes of different boundary ranges may be compared by comparing any suitable measure of the sizes of the different boundary ranges, such as comparing absolute sizes or comparing maximum or minimum values of different ranges of values.

In some implementations, the vehicle boundary range may be set differently depending on a parking path C.

For example, when the congestion level is calculated differently at travel positions as the vehicle travels along the parking path C, the processor 170 may set different vehicle boundary ranges for the positions.

Figure 15A:
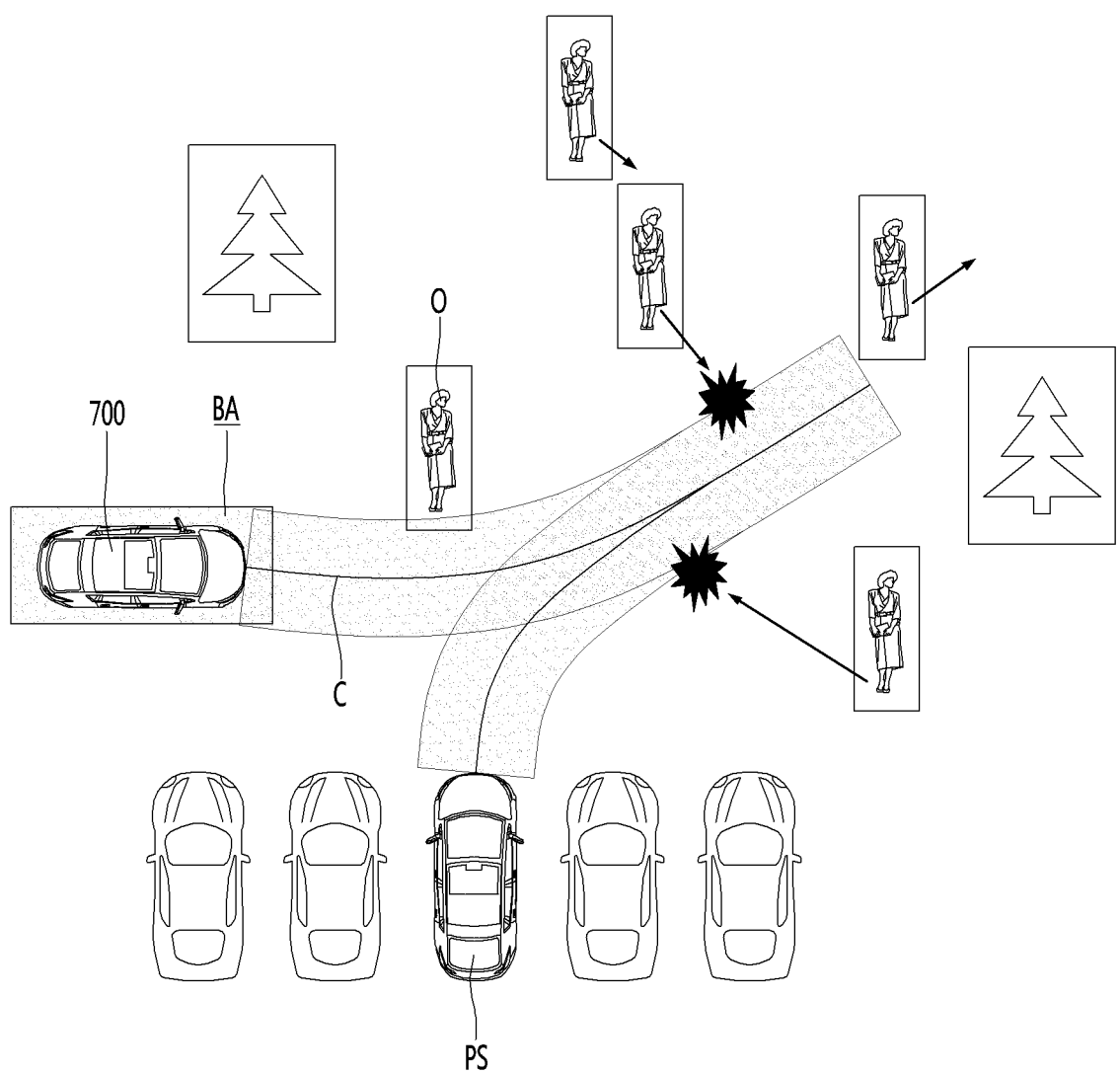
FIGS. 15A and 15B are diagrams illustrating examples of scenarios in which a vehicle boundary range is set based on a boundary region of an object according to object characteristics according to some implementations.

Specifically, it can be seen from FIG. 15A, that interference of an object O exists and then disappears at the beginning of traveling of the vehicle and interference with another object O is caused in a parking path C.

Figure 15B:
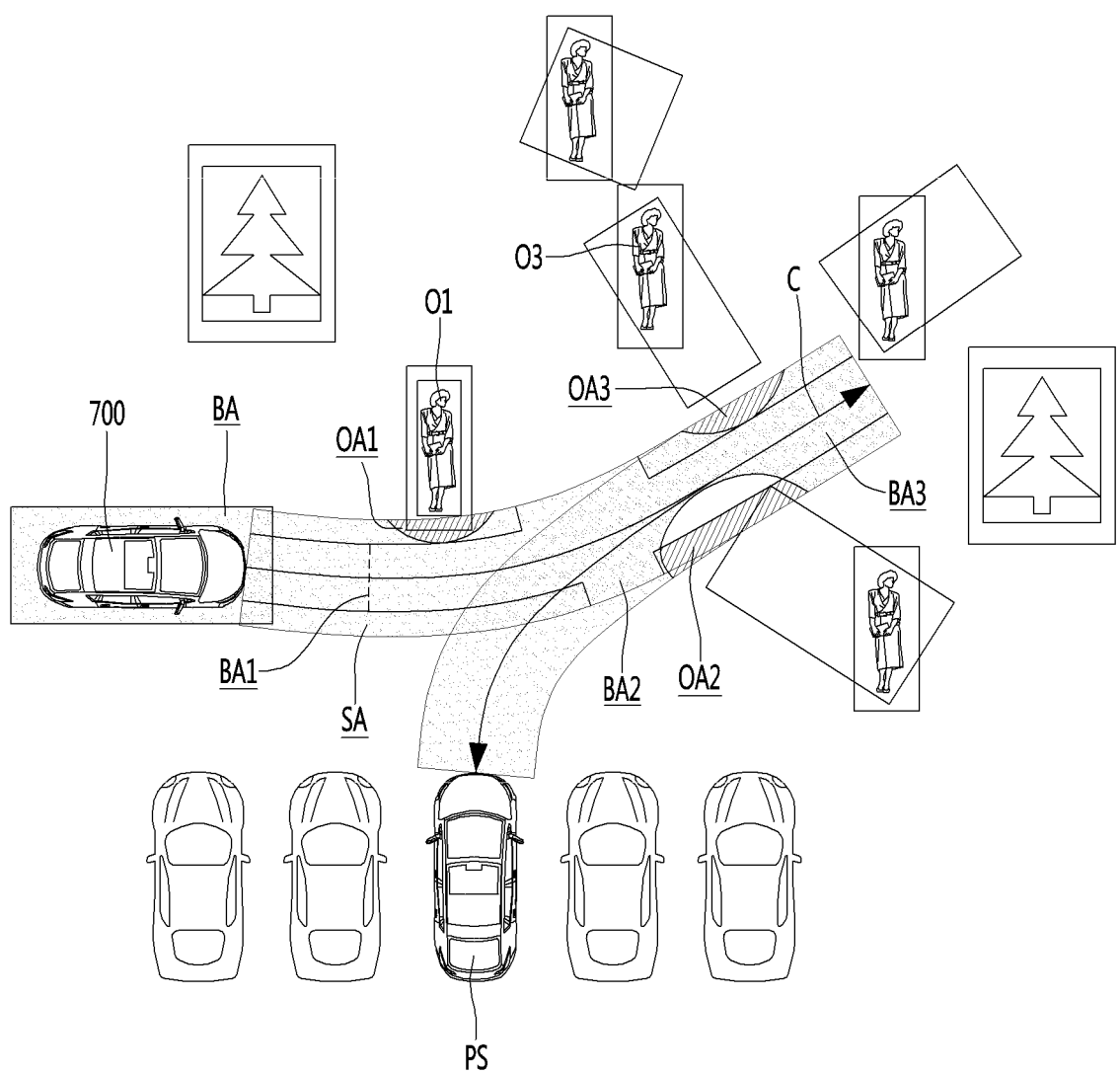

Therefore, referring to FIG. 15B, the processor 170 may set the vehicle boundary range to a first boundary range BA1 which has been reduced so as to prevent overlapping of the object O in the beginning region of the parking path C, to a second boundary range BA2 with a general size in the middle region of the parking path, and to a third boundary range BA3 which has been reduced so as to prevent overlapping of a third object in the remaining parking path.

Therefore, the processor 170 may perform control such that the vehicle travels at a low speed in the first boundary range BA1, then at a high speed in the second boundary range BA2, and again at a low speed in the third boundary range BA3.

The vehicle boundary range may be changed in size depending on the amount of sensing of a vehicle sensor as well as the object.

Figure 16:
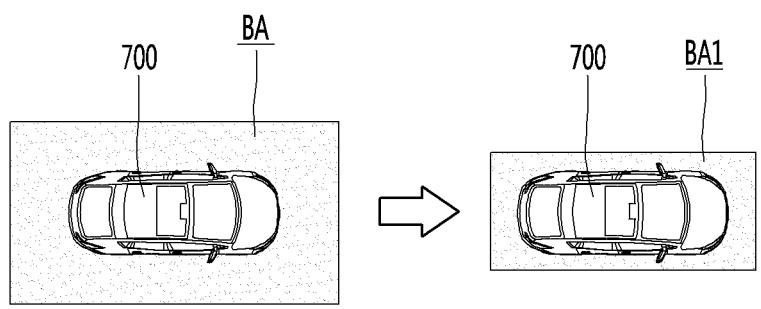
FIG. 16 is a diagram illustrating an example of a scenario in which a vehicle boundary range is set according to an illumination intensity of the vehicle's surroundings according to some implementations.

Specifically, referring FIG. 16, since sensing sensitivity decreases when an illumination intensity of the vehicle's surroundings is low, the processor 170 may expand the vehicle boundary range BA, achieving safe traveling.

In this case, the traveling speed of the vehicle may be adjusted to be inversely related to, for example inversely proportional to, the vehicle boundary range BA.

Also, the vehicle boundary range BA may be changed depending on the gradient of a vehicle travel road.

The reason for this is that a braking position is changed depending on the gradient although the same braking power is applied.

Figure 17:
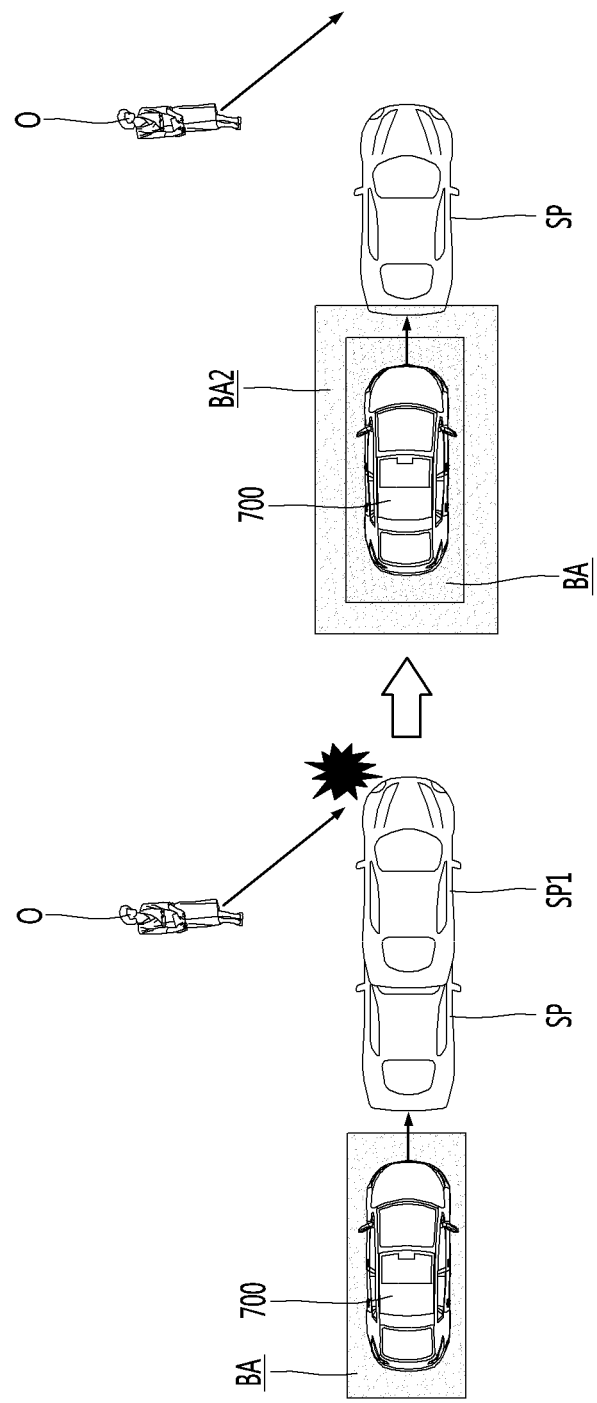
FIG. 17 is a diagram illustrating an example of a scenario in which a vehicle boundary range is set according to a gradient of a vehicle travel road according to some implementations.

Referring to FIG. 17, if the vehicle is stopped at a braking position SP when the vehicle is braked in a general flatland, when the vehicle is braked in a slope with a low gradient, the vehicle may be stopped at a first braking position SP1 which is further moved than the braking position SP.

Therefore, the processor 170 may reduce the boundary range when the vehicle travels up a slope, and expand the boundary range when the vehicle travels down the slope, thus controlling braking in advance.

In this case, the traveling speed of the vehicle may be adjusted to be inversely related to, for example inversely proportional to, the vehicle boundary range BA.

On the other hand, the processor 170 may control the display unit 180 to display automatic parking information about the vehicle boundary range BA, the movement speed of the vehicle, and the like, thus enhancing convenience of a user.

Figure 18A:
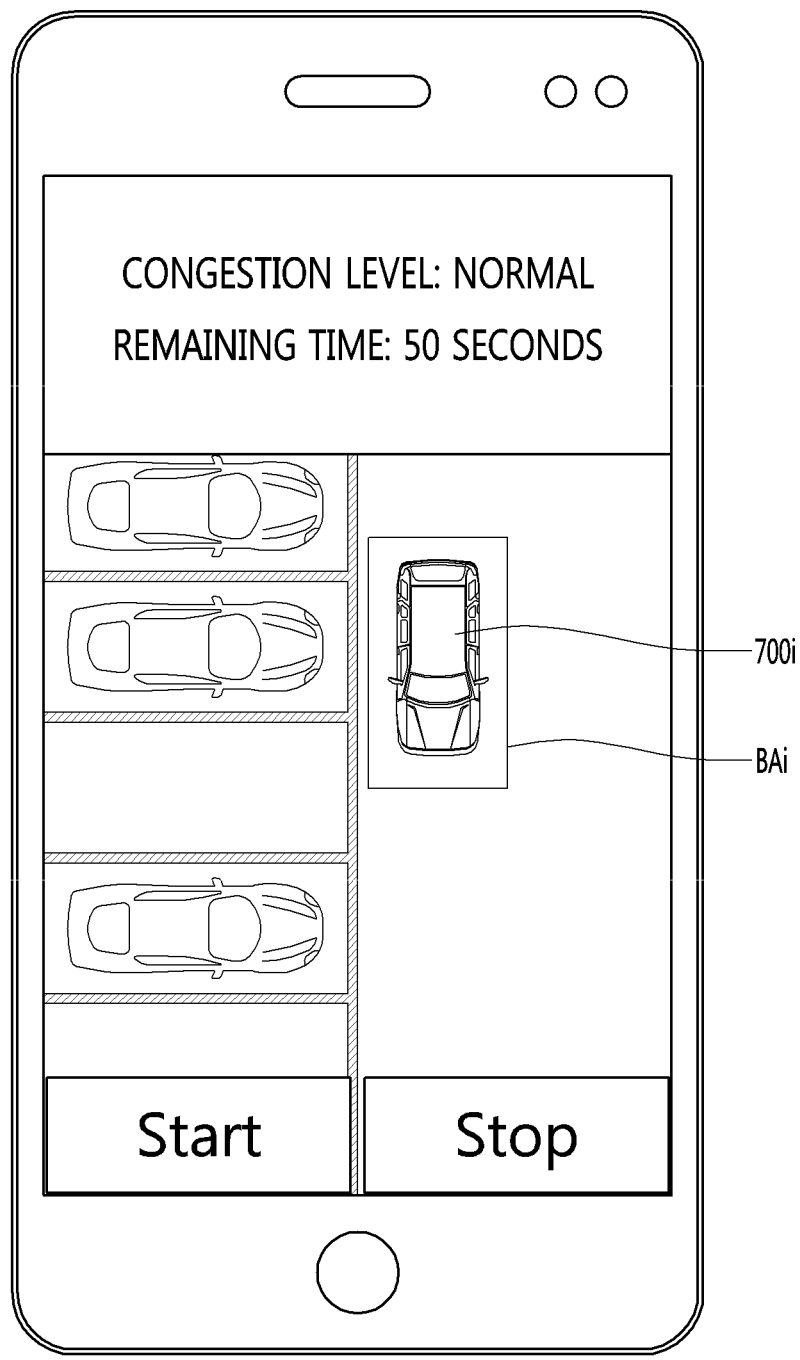
FIGS. 18A to 18C are examples user interfaces of a display unit during execution of an automatic parking function based on a congestion level according to some implementations.
Figure 18B:
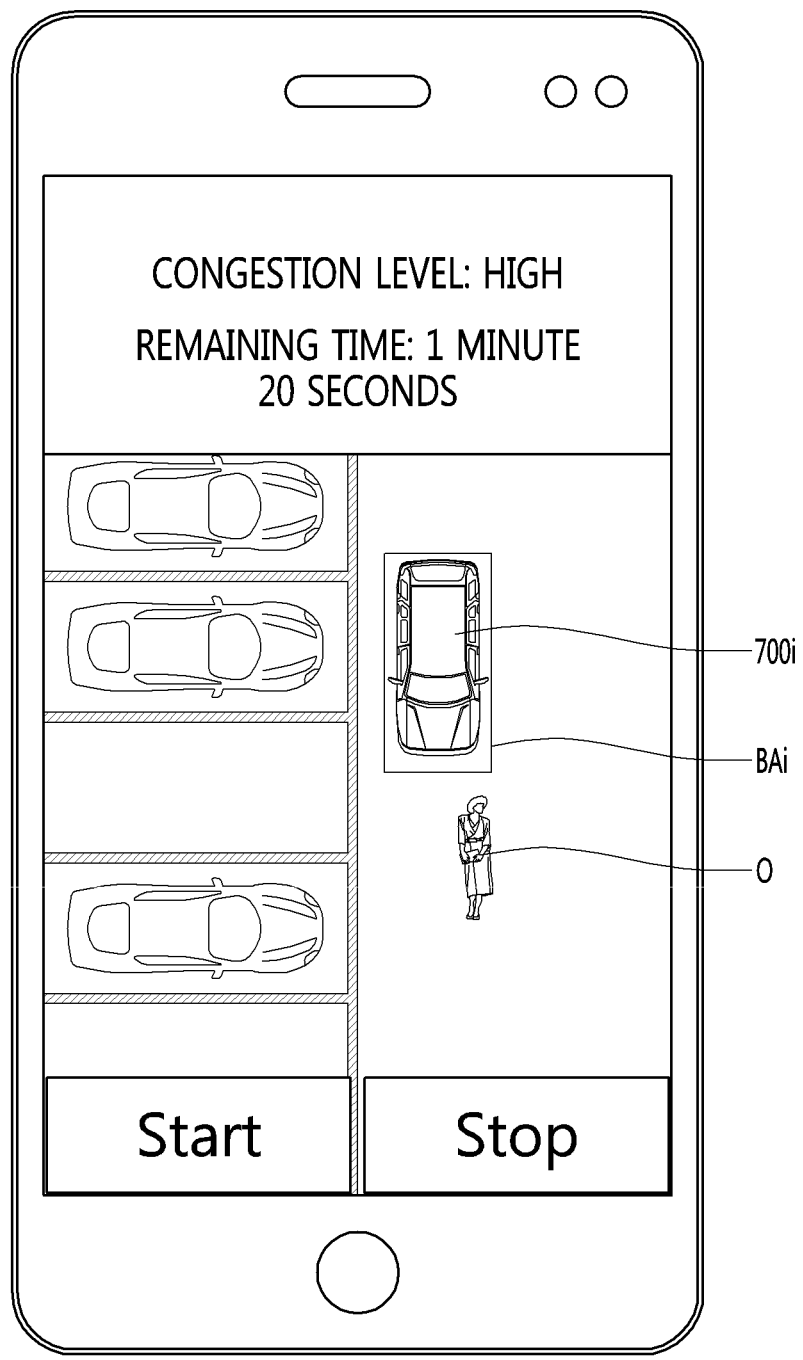
Figure 18C:
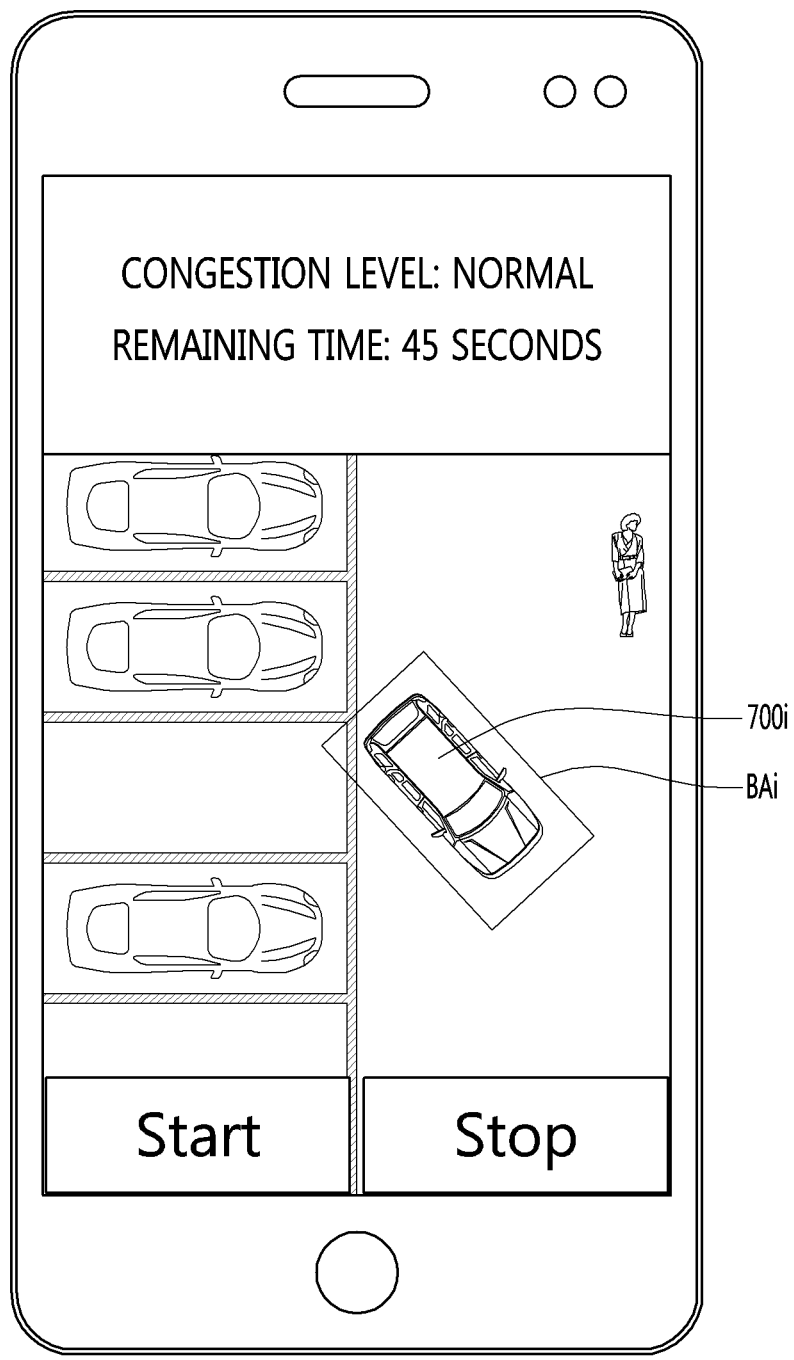

Referring to FIGS. 18A to 18C, there is provided a screen which displays a change in the vehicle boundary range according to the congestion level of the vehicle's surroundings which is changed in real time.

Referring to FIG. 18A, the display unit 180 may display an image of a general boundary range BAi in a state in which the congestion level is normal.

Referring to FIG. 18B, when the congestion level increases since an object is detected around the vehicle, the display unit 180 may display the congestion level, an increased time required for automatic parking, and an image of a changed first boundary range BAi.

Referring to FIG. 18C, when the congestion level decreases since an object deviates from the monitoring region SA, the display unit 180 may display the reduced congestion level, a decreased time required for automatic parking, and an image of the changed general boundary range BAi.

Figure 19A:
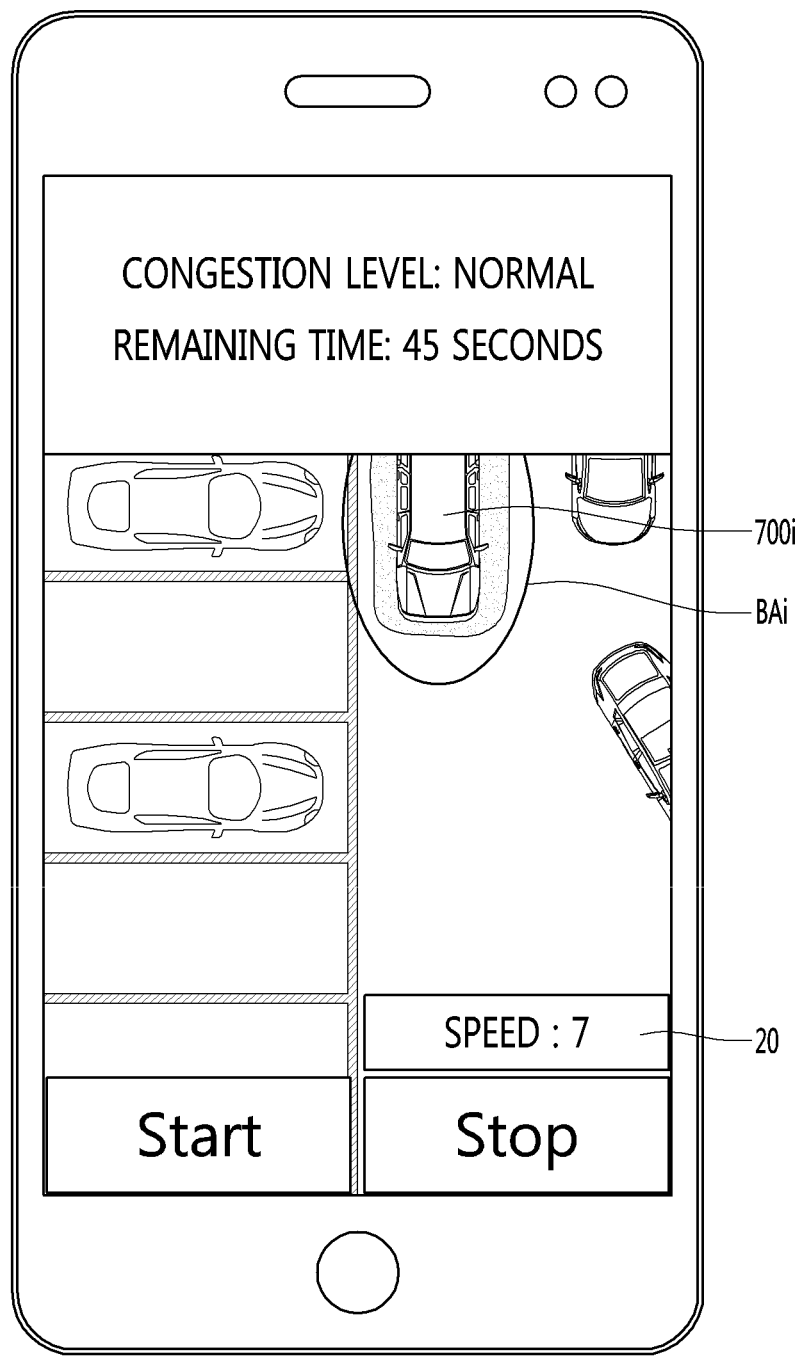
FIGS. 19A to 19D are further examples of user interfaces of a display unit during execution of an automatic parking function based on a congestion level according to some implementations.

Referring to FIG. 19A, the display unit 180 may display the image of the vehicle boundary range BAi, an image of the monitoring region SA, and an image of a vehicle movement speed 20.

Figure 19B:
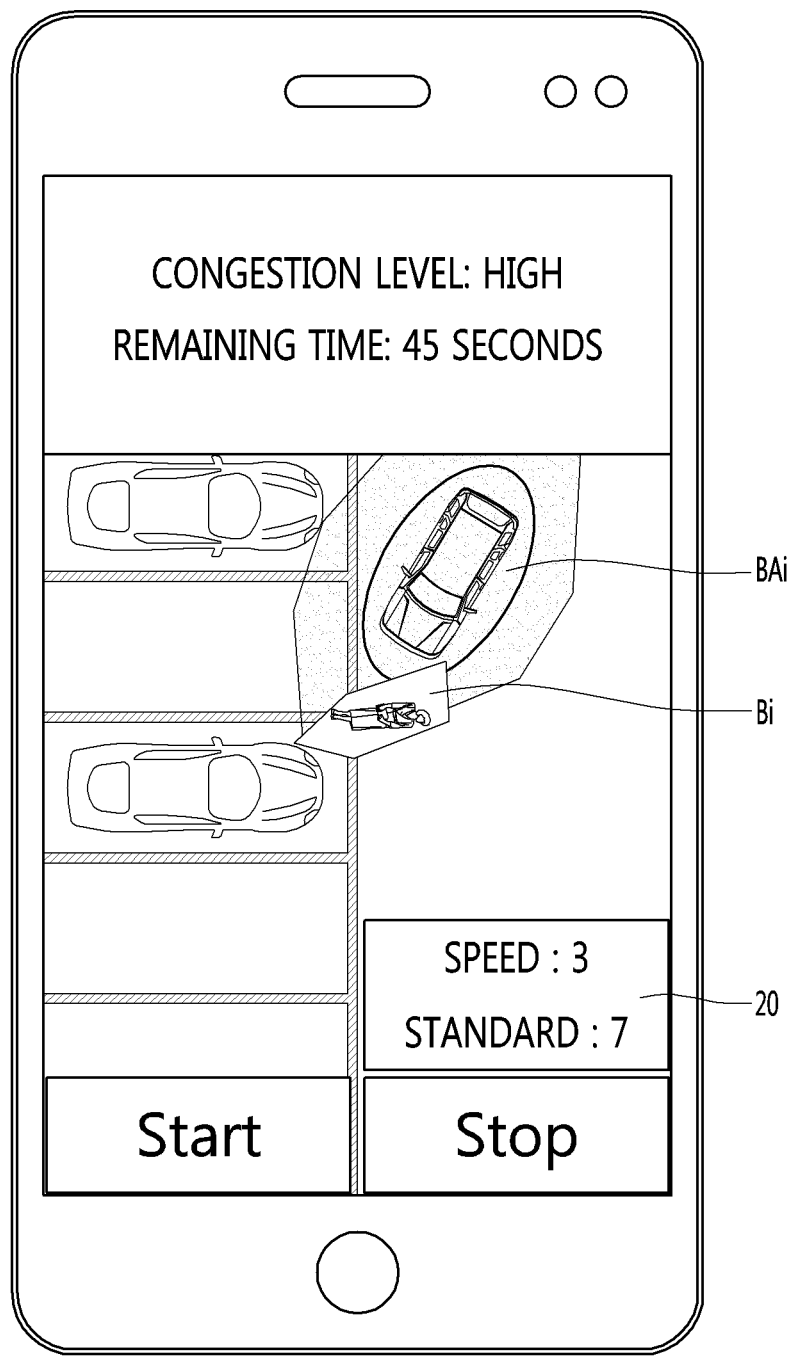

Referring to FIG. 19B, when the congestion level increases since an object is detected around the vehicle, the display unit 180 may display the increased congestion level, the image of the decreased vehicle movement speed 20, and the increased time required for automatic parking.

In addition, the display unit 180 may display an object boundary region image Bi, a boundary range image BAi and a region in which the boundary region and the boundary range overlap each other.

The display unit 180 may reduce the boundary range so as not to overlap the boundary region when the boundary range and the boundary region overlap each other.

Figure 19C:
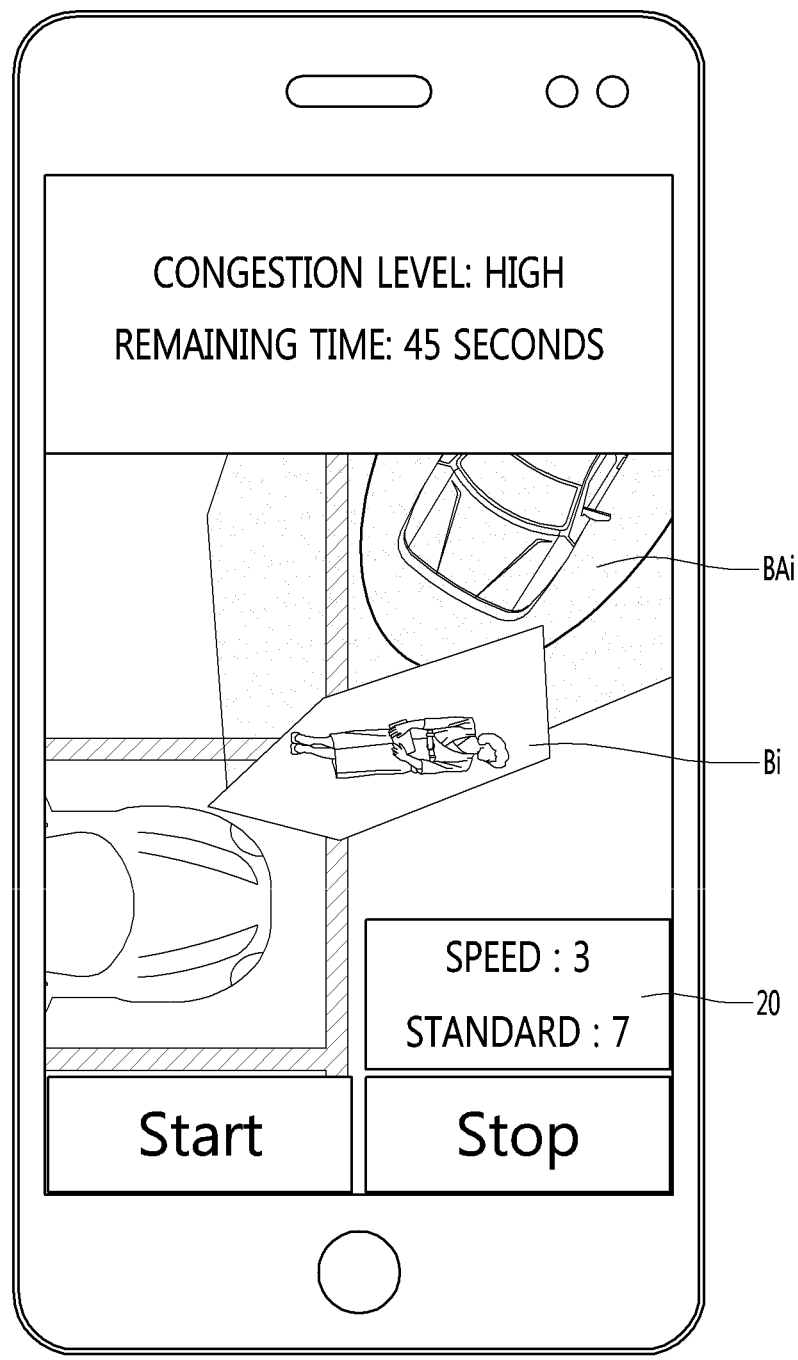

Referring to FIG. 19C, the display unit 180 may zoom in and display an object surrounding region in order to more certainly display a distance between the object and the vehicle when the vehicle boundary range BAi is reduced. As such, the display unit 180 may display more details of the surroundings of the vehicle with a greater zoom level when the size of the boundary range is smaller.

Figure 19D:
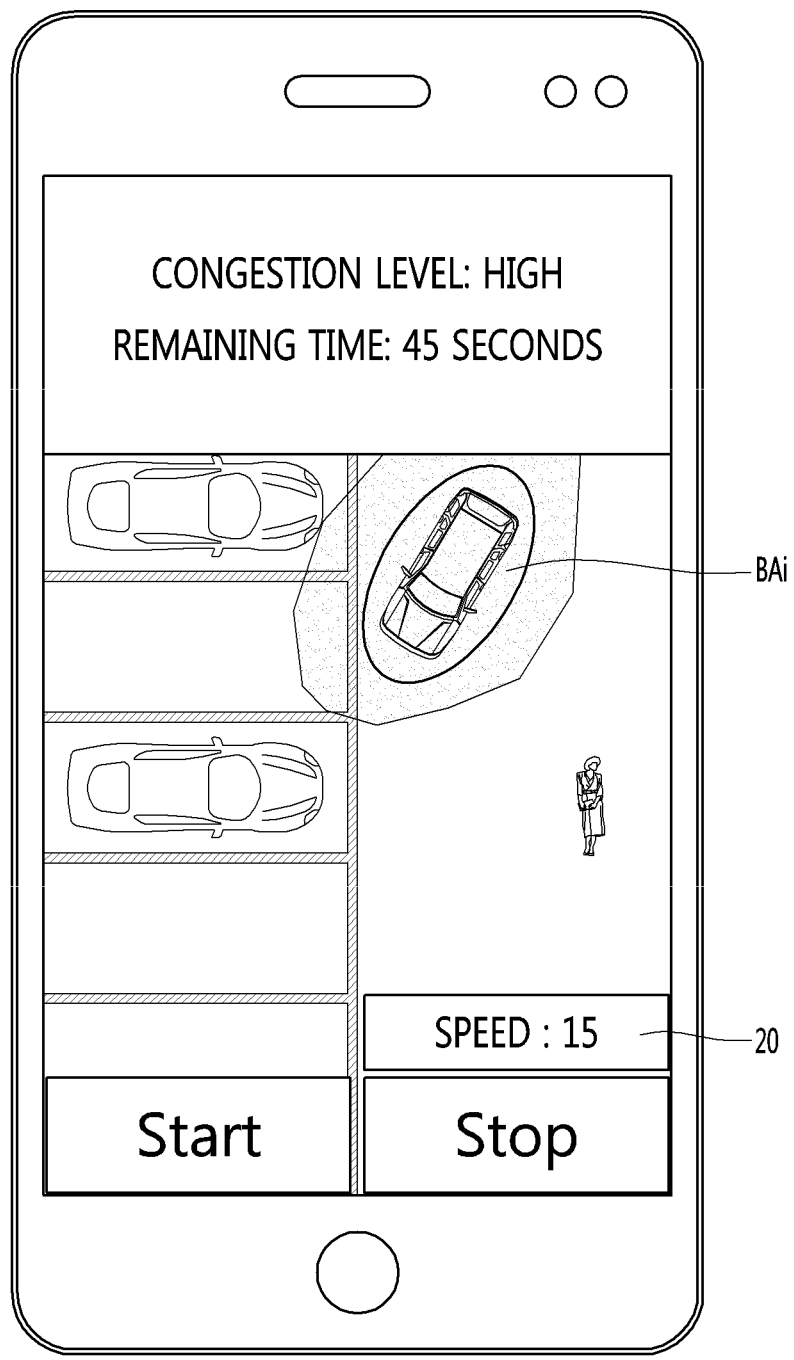

On the other hand, referring to FIG. 19D, the display unit 180 may zoom out and display the object surrounding region when the vehicle boundary range BAi is expanded, which may occur for example due to movement of the object. As such, the display unit 180 may display a larger area surrounding the vehicle with a smaller zoom level when the size of the boundary range is larger.

As described above, the processor 170 may control a traveling speed of the vehicle depending on the congestion level (S304).

Since the vehicle boundary range is determined depending on the congestion level, it may be considered that the movement speed of the vehicle is determined depending on the congestion level.

Specifically, the processor 170 may perform control such that the vehicle is moved at a lower speed as the size of the vehicle boundary range is smaller, and perform control such that the vehicle is moved at a higher speed as the size of the vehicle boundary range is larger.

As such, in some implementations, when the congestion level is high, the processor 170 may reduce the size of the vehicle boundary range BA to prevent frequent stopping of the vehicle and perform control such that the vehicle is moved at a low speed for safety, thus performing the automatic parking function smoothly even when the vehicle's surroundings is congested.

On the other hand, the processor 170 may expand the vehicle boundary range while moving the vehicle at a high speed when the congestion level is low, thus allowing the vehicle to be parked safely and rapidly in a comfort environment.

On the other hand, the processor 170 may design a parking path for directing the vehicle to a target parking position differently depending on the congestion level (S305).

Specifically, the processor 170 may reduce a distance to the maximum movement position in the parking path C when the congestion level is high.

The maximum movement position refers to a position farthest from a current position of the vehicle in the designed parking path C.

The processor 170 may move the vehicle within a small radius as possible, thus minimizing interference with the object.

In order to move the vehicle within the small radius as possible, the processor 170 may design the parking path C in which the number of times of turning is increased as the congestion level is higher.

In this case, the number of times of turning refers to the number of times of turning of vehicle from forward movement to reverse movement or from reverse movement to forward movement.

For example, the processor 170 may design a parking path C in which the number of times of turning is increased by setting the parking path C making the maximum movement distance of the vehicle short.

Figure 20A:
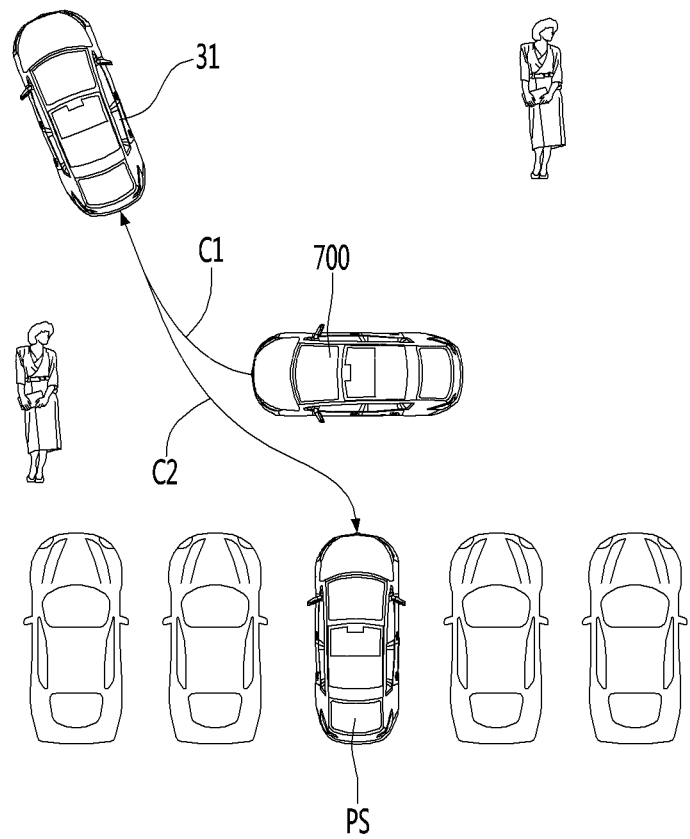
FIGS. 20A and 20B are diagrams illustrating comparison of parking paths designed in situations with different congestion levels according to some implementations.
Figure 20B:
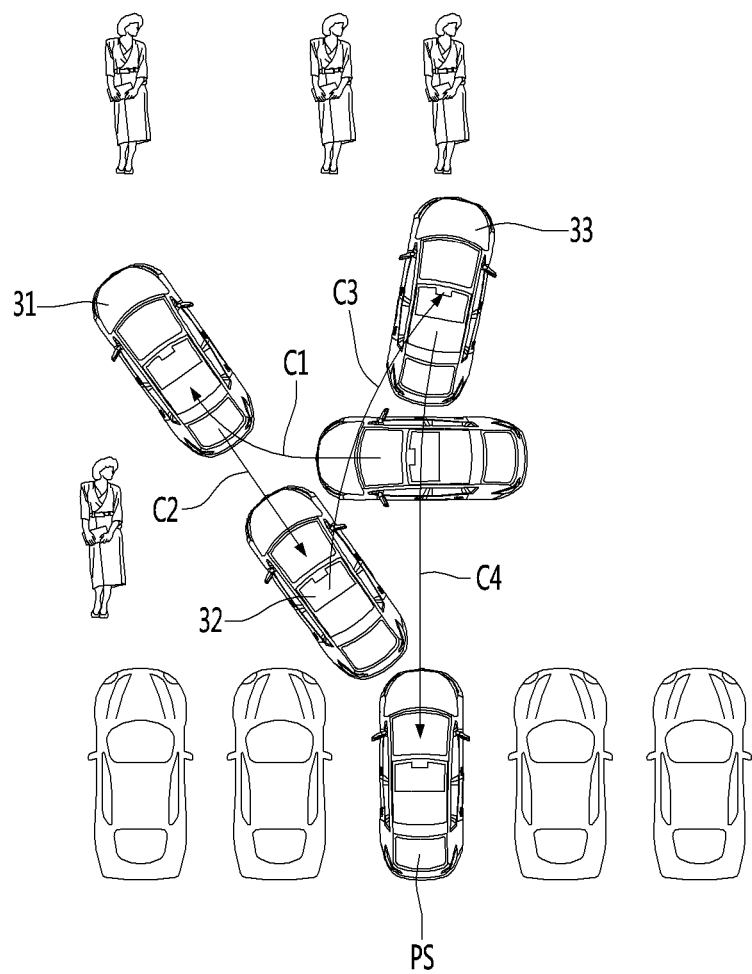

For example, referring to FIG. 20A, when the congestion level is low, the processor 170 may design a parking path including a first parking path C1 for route from a current vehicle position to a first position 31, a second parking path C2 for route from the first position 31 to a target parking position PS in the parking path in which there is turning at the first position 31.

Referring to 20B, when the congestion level is high, the processor 170 may design a parking path in which there is turning at the first position 31, a second position C2, and a third position C3.

Specifically, the processor 170 may determine the first position 31 at which first turning exist more closely than the first position 31 of FIG. 20A and further determine the second position C2 and the third position C3 for route to the target parking position PS, thus designing the parking path including the first to third positions C1, C2, and C3.

Also, the processor 170 may design another parking path in which a parking method is different depending on the congestion level.

Specifically, the processor 170 may determine a parking method, such as a forward parking method, a reverse parking method, a parallel parking method, a perpendicular parking method, and the like in order to reduce interference with an object and design a parking path in which the maximum movement distance is small.

Figure 21A:
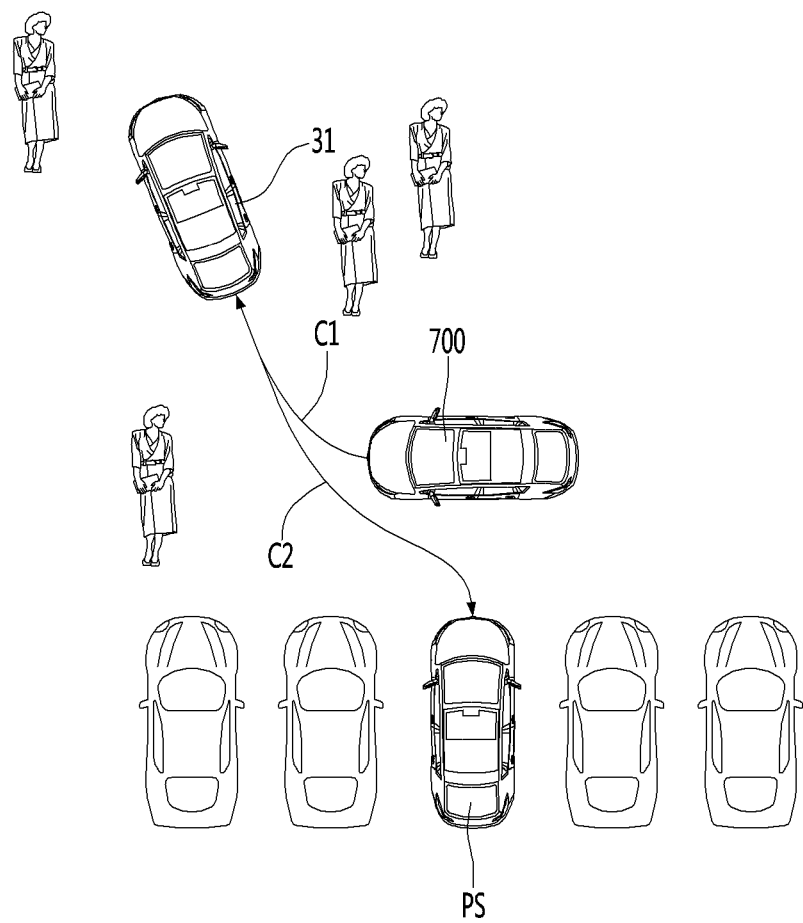
FIGS. 21A and 21B are diagrams illustrating examples in which different parking paths are designed with respect to different congestion levels according to some implementations.

Referring to FIG. 21A, when the congestion level is low, the processor 170 may set the first position 31 which is the maximum movement position of the vehicle, to a sufficiently-far position, thus designing a parking path for allowing the vehicle to be parked according to a reverse parking method.

Figure 21B:
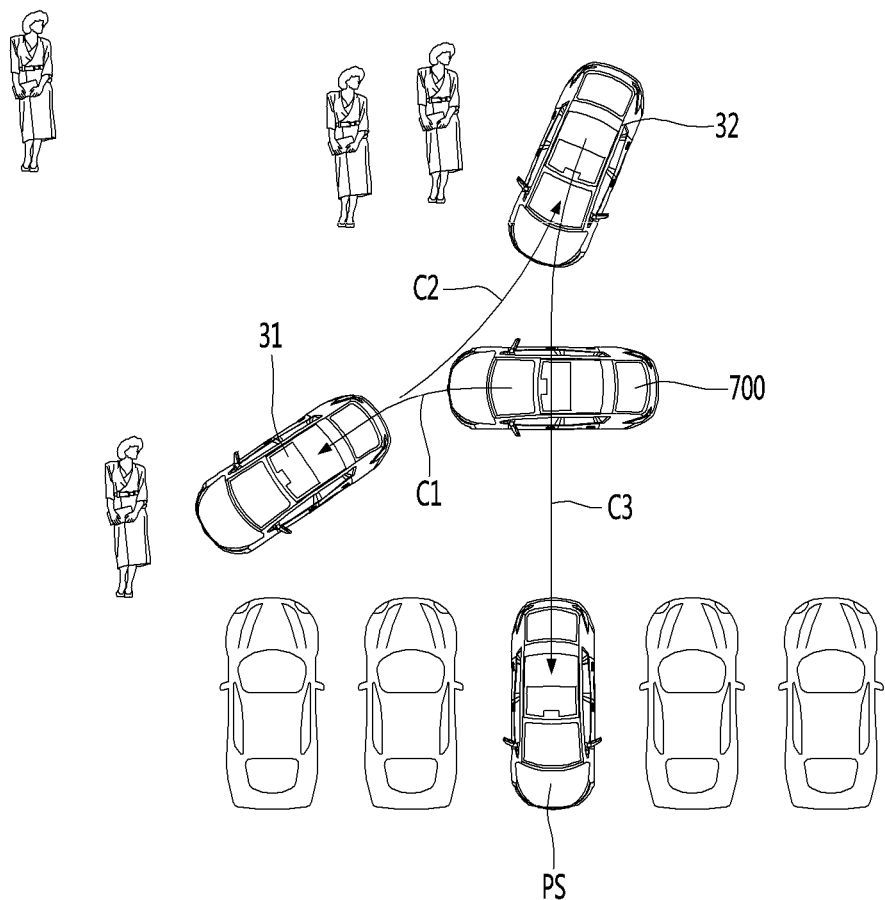

Referring to FIG. 21B, when the congestion level is high, in order to reduce interference with an object, the processor 170 may set the first position 31 to a sufficiently-close position in order to reduce the maximum movement position of the vehicle, thus designing a parking path for allowing the vehicle to be parked according to a forward parking method.

As such, in some implementations, the processor 170 may design an improved parking path depending on the congestion level to maximally reduce interference with an object during parking of the vehicle, preventing frequent stopping of the vehicle and smoothly executing the automatic parking function even when the vehicle's surroundings are congested.

On the other hand, the processor 170 may control the display unit 180 to display the calculated parking path through a graphic image.

Since calculation of the congestion level is performed in real time, when the congestion level is changed, and the parking path is redesigned, the existing parking path is deleted and a newly-designed parking path is displayed.

Figure 22A:
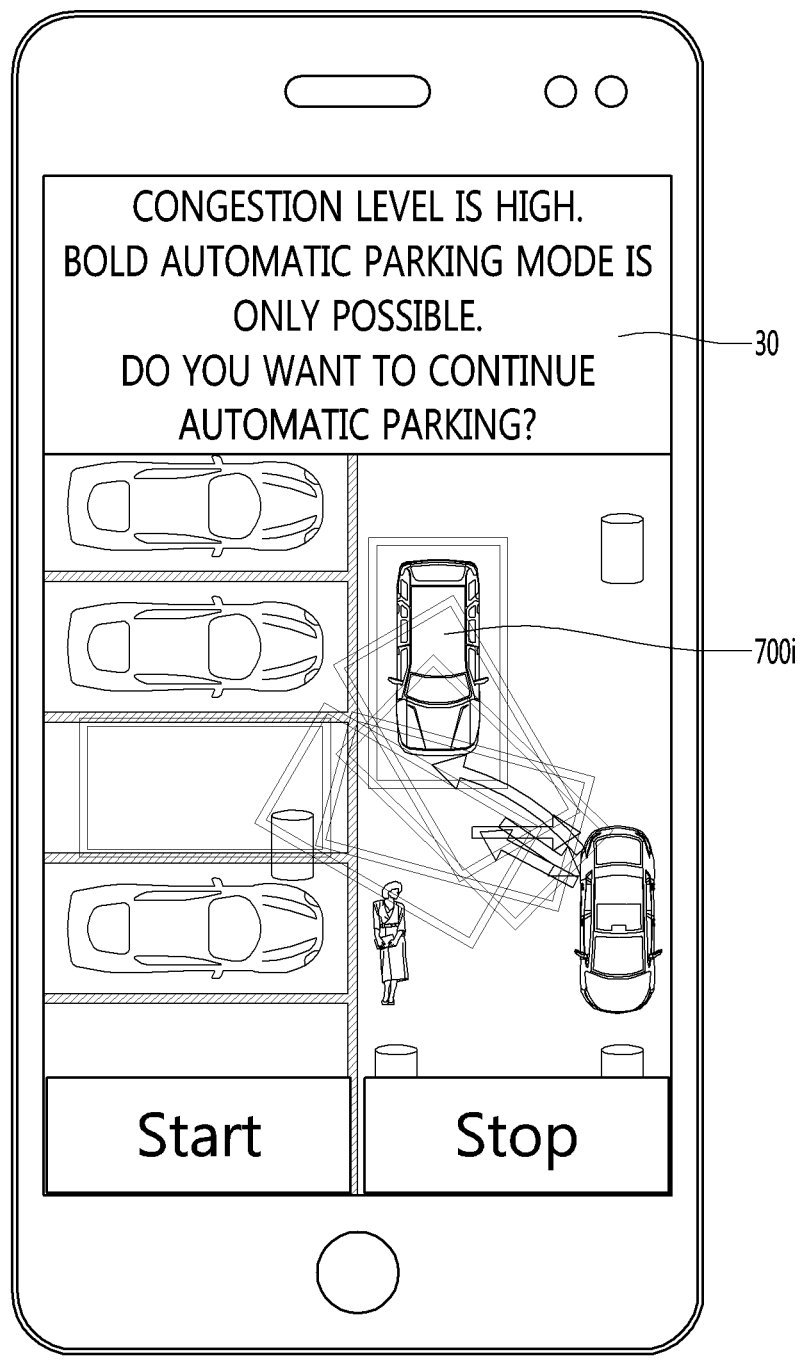
FIGS. 22A and 22B are examples of user interfaces of a display unit during execution of an automatic parking function based on a congestion level according to some implementations.
Figure 22B:
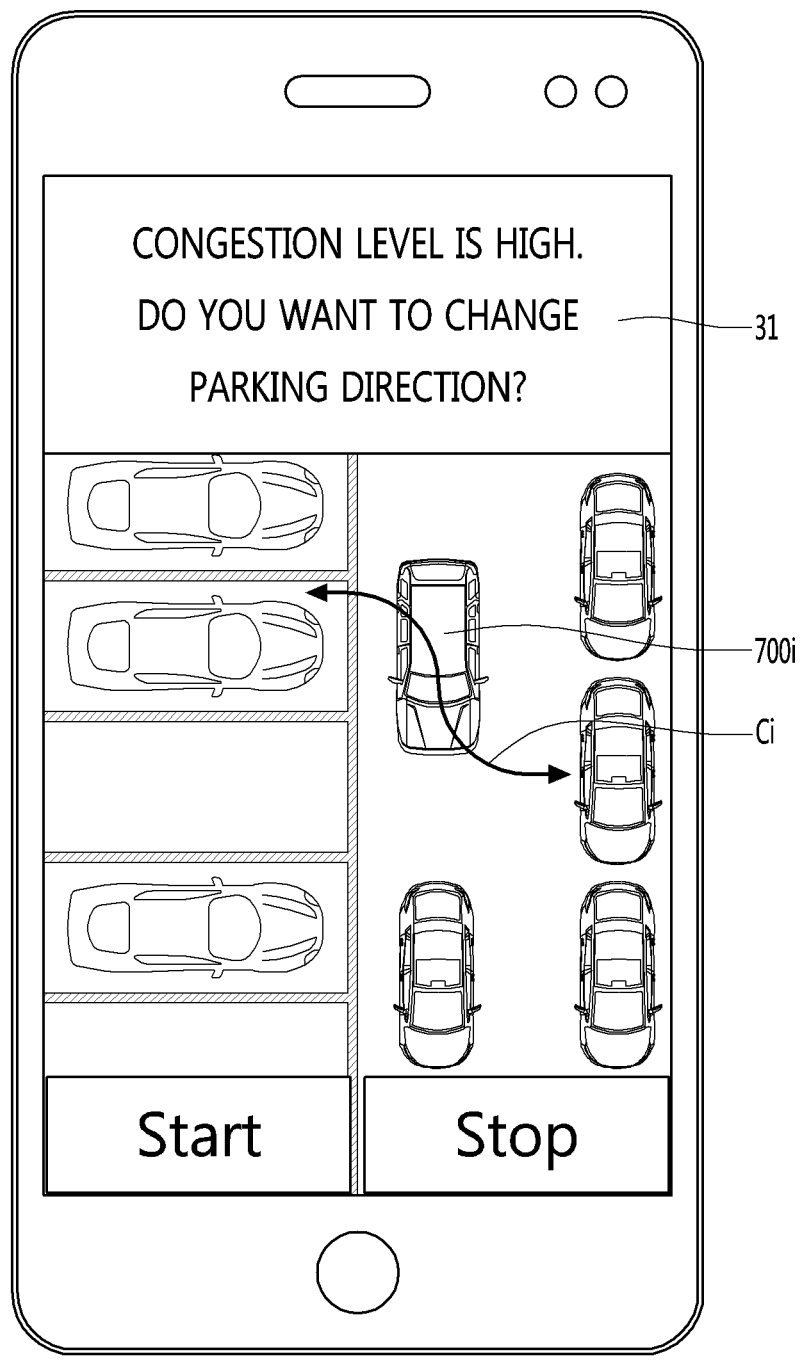

Referring to FIG. 22, the display unit 180 may display an image 30 for suggesting a bold automatic parking mode in which automatic parking is executed even when the congestion level is high because the vehicle boundary range BA is reduced.

Referring to FIG. 23, when a parking path is redesigned because the congestion level is high, the display unit 180 displays the redesigned parking path Ci and an image of inquiring of a user whether to park the vehicle along the redesigned parking path Ci.

Figure 23A:
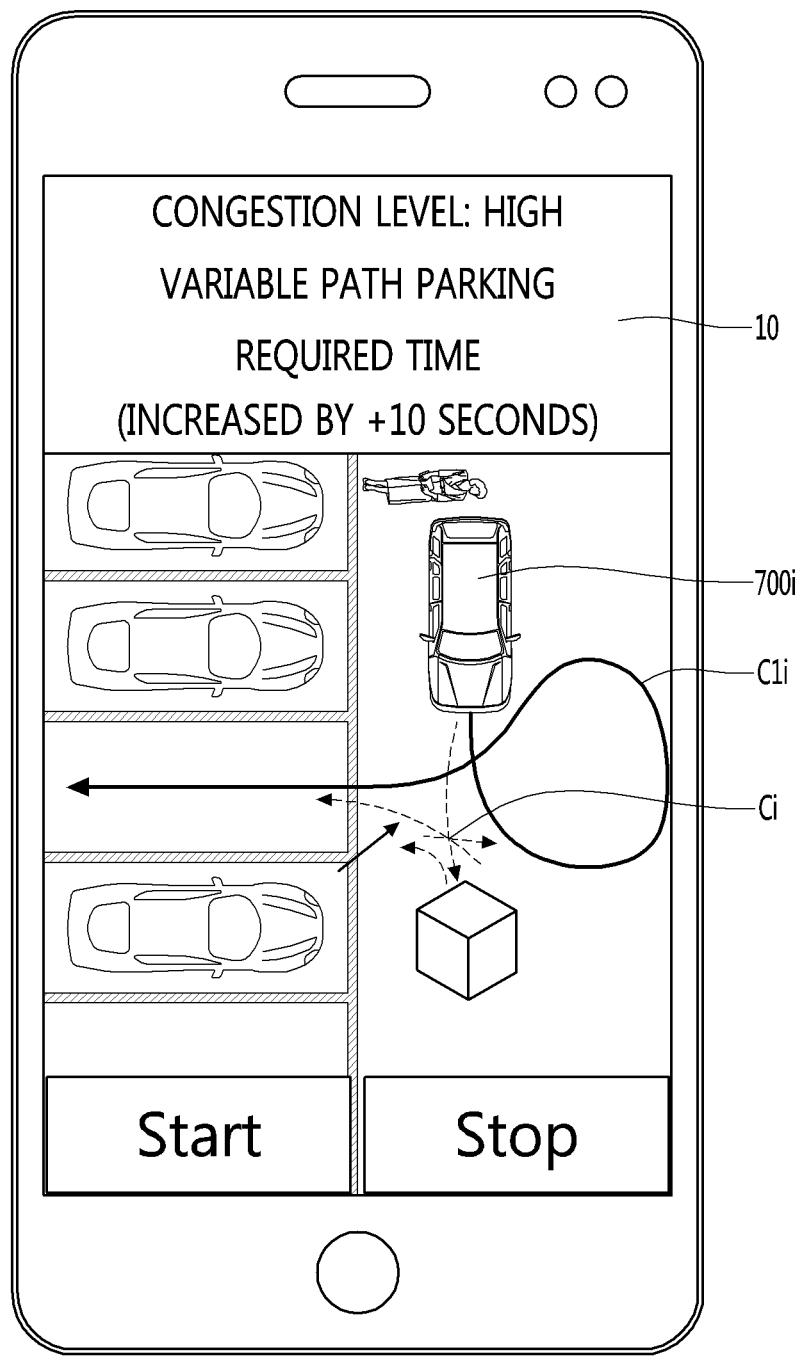
FIGS. 23A and 23B are other examples of user interfaces of a display unit during execution of an automatic parking function based on a congestion level according to some implementations.

Also, referring to FIG. 23A, when a fixed object is detected, the processor 170 may design a parking path C1$i$ avoiding the fixed object and having no direction change. In this case, the display unit 180 may display the newly-designed parking path C1$i$.

Figure 23B:
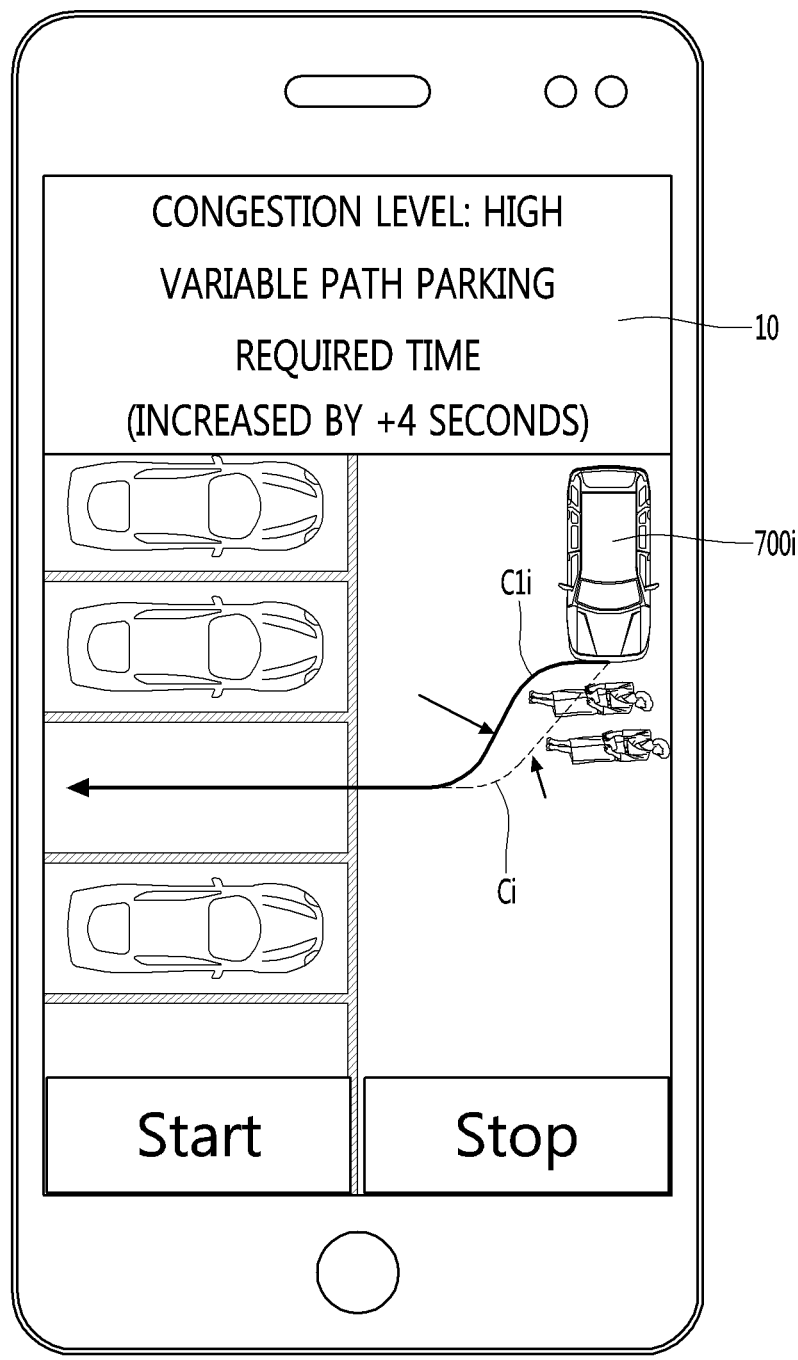

Also, referring to FIG. 23B, when a moving object is detected, the processor 170 may design a parking path C1$i$ avoiding the moving object. In this case, the display unit 180 may display the newly-designed parking path C1$i$.

As described above, the processor 170 may execute the automatic parking function in different manners depending on the congestion level, thus providing an optimal automatic parking function depending on a congested environment and a comfort environment.

Figure 24:
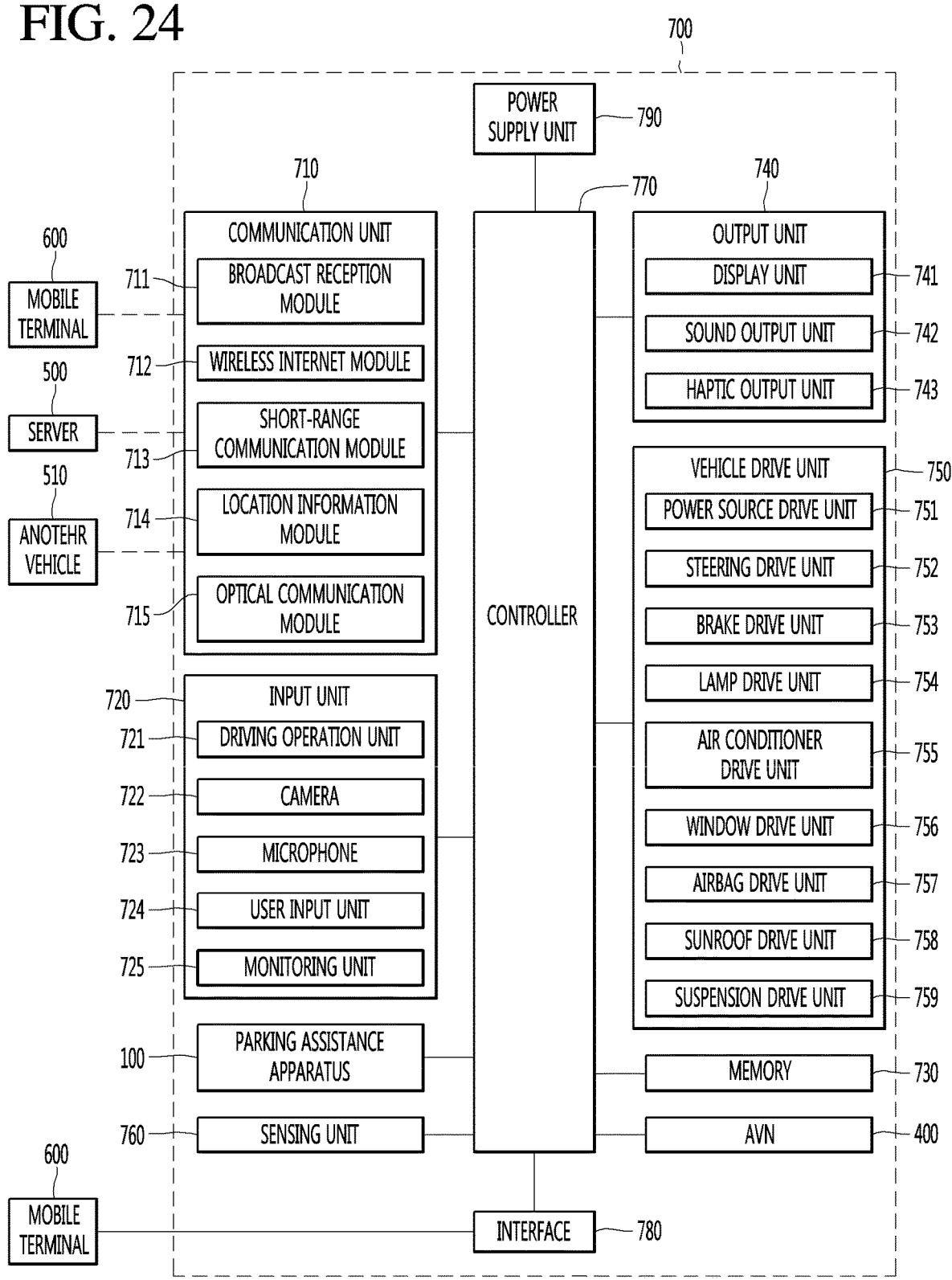
FIG. 24 is a block diagram illustrating an example of an internal configuration of the vehicle having the parking assistance apparatus shown in FIG. 1.

Referring to FIG. 24, the above-described parking assistance apparatus 100 may be included in the vehicle 700.

The vehicle 700 may include a communication unit 710, an input unit 720, a sensing unit 760, an output unit 740, a vehicle drive unit 750, a memory 730, an interface 780, a controller 770, a power supply unit 790, a parking assistance apparatus 100 and AVN apparatus 400. Here, among the units included in the parking assistance apparatus 100 and the units of the vehicle 700, the units having the same names are described as being included in the vehicle 700.

The communication unit 710 may include one or more modules which permit communication such as wireless communication between the vehicle and the mobile terminal 600, between the vehicle and the external server 50 or between the vehicle and the other vehicle 510. Further, the communication unit 710 may include one or more modules which connect the vehicle to one or more networks.

The communication unit 710 includes a broadcast receiving module 711, a wireless Internet module 712, a short-range communication module 713, and an optical communication module 715.

The broadcast reception module 711 receives a broadcast signal or broadcast related information from an external broadcast management server through a broadcast channel. Here, the broadcast includes a radio broadcast or a TV broadcast.

The wireless Internet module 712 refers to a wireless Internet access module and may be provided inside or outside the vehicle. The wireless Internet module 712 transmits and receives a wireless signal through a communication network according to wireless Internet access technologies.

Examples of such wireless Internet access technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 712 may transmit/receive data according to one or more of such wireless Internet technologies, and other Internet technologies as well. For example, the wireless Internet module 712 may wirelessly exchange data with the external server 500. The wireless Internet module 712 may receive weather information and road traffic state information (e.g., transport protocol experts group (TPEG) information) from the external server 500.

The short-range communication module 713 is configured to facilitate short-range communication. Such short-range communication may be supported using at least one of Bluetooth™, Radio Frequency Identification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

The short-range communication module 713 may form a wireless local area network to perform short-range communication between the vehicle and at least one external device. For example, the short-range communication module 713 may wirelessly exchange data with the mobile terminal 600. The short-range communication module 713 may receive weather information and road traffic state information (e.g., transport protocol experts group (TPEG) information) from the mobile terminal 600. When a user rides in the vehicle, the mobile terminal 600 of the user and the vehicle may pair with each other automatically or by executing the application of the user.

A location information module 714 acquires the location of the vehicle and a representative example thereof includes a global positioning system (GPS) module. For example, the vehicle may acquire the location of the vehicle using a signal received from a GPS satellite upon utilizing the GPS module.

The optical communication module 715 may include a light emitting unit and a light reception unit.

The light reception unit may convert a light signal into an electric signal and receive information. The light reception unit may include a photodiode (PD) for receiving light. The photodiode may covert light into an electric signal. For example, the light reception unit may receive information on a preceding vehicle through light emitted from a light source included in the preceding vehicle.

The light emitting unit may include at least one light emitting element for converting electrical signals into a light signal. Here, the light emitting element may be a Light Emitting Diode (LED). The light emitting unit converts electrical signals into light signals to emit the light. For example, the light emitting unit may externally emit light via flickering of the light emitting element corresponding to a prescribed frequency. In some implementations, the light emitting unit may include an array of a plurality of light emitting elements. In some implementations, the light emitting unit may be integrated with a lamp provided in the vehicle. For example, the light emitting unit may be at least one selected from among a headlight, a taillight, a brake light, a turn signal, and a sidelight. For example, the optical communication module 715 may exchange data with the other vehicle 510 via optical communication.

The input unit 720 may include a driving operation unit 721, a camera 195, a microphone 723 and a user input unit 724.

Figure 7:
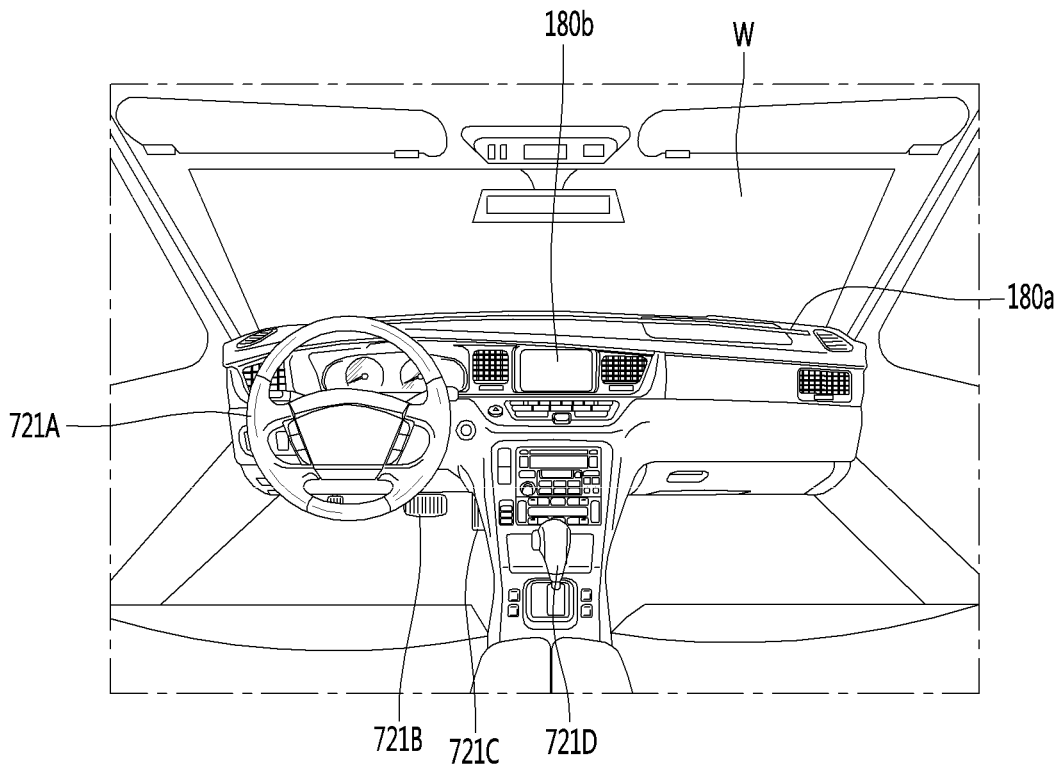
FIG. 7 is a diagram illustrating an example of an inside of a vehicle having a parking assistance apparatus according to some implementations.

The driving operation unit 721 receives user input for driving of the vehicle (see FIG. 7). The driving operation unit 721 may include a steering input unit 721A, a shift input unit 721D, an acceleration input unit 721C and a brake input unit 721B.

The steering input unit 721A is configured to receive user input with regard to the direction of travel of the vehicle. The steering input unit 721A may include a steering wheel using rotation. In some implementations, the steering input unit 721A may be configured as a touchscreen, a touch pad, or a button.

The shift input unit 721D is configured to receive input for selecting one of Park (P), Drive (D), Neutral (N), and Reverse (R) gears of the vehicle from the user. The shift input unit 721D may have a lever form. In some implementations, the shift input unit 721D may be configured as a touchscreen, a touch pad, or a button.

The acceleration input unit 721C is configured to receive input for acceleration of the vehicle from the user. The brake input unit 721B is configured to receive input for speed reduction of the vehicle from the user. Each of the acceleration input unit 721C and the brake input unit 721B may have a pedal form. In some implementations, the acceleration input unit 721C or the brake input unit 721B may be configured as a touchscreen, a touch pad, or a button.

The camera 722 may include an image sensor and an image processing module. The camera 722 may process a still image or a moving image obtained by the image sensor (e.g., CMOS or CCD). In addition, the image processing module processes the still image or the moving image acquired through the image sensor, extracts necessary information, and delivers the extracted information to the controller 770. The vehicle may include the camera 722 for capturing the front image of the vehicle or the image of the vicinity of the vehicle and the monitoring unit 725 for capturing the image of the space inside the vehicle.

The monitoring unit 725 may acquire an image of a passenger. The monitoring unit 725 may acquire an image for biometric information of the passenger.

Although the monitoring unit 725 and the camera 722 are included in the input unit 720 in FIG. 24, the camera 722 may be included in the parking assistance apparatus 100 as described above.

The microphone 723 may process external sound signals into electrical data. The processed data may be utilized in various ways according to a function that the vehicle is performing. The microphone 723 may convert a user voice command into electrical data. The converted electrical data may be transmitted to the controller 770.

In some implementations, a camera 722 or the microphone 723 may not be included in the input unit 720 but may be included in the sensing unit 760.

The user input unit 724 is configured to receive information from the user. When information is input via the user input unit 724, the controller 770 may control the operation of the vehicle to correspond to the input information. The user input unit 724 may include a touch input unit or a mechanical input unit. In some implementations, the user input unit 724 may be located in a region of the steering wheel. In this case, the driver may operate the user input unit 724 with the fingers while gripping the steering wheel.

The sensing unit 760 is configured to sense signals associated with, for example, signals related to driving of the vehicle. To this end, the sensing unit 760 may include a collision sensor, a wheel sensor, a speed sensor, tilt sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, a radar, a Lidar, etc.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, etc.

In some implementations, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric sensor. The biometric sensor senses and acquires biometric information of the passenger. The biometric information may include fingerprint information, iris-scan information, retina-scan information, hand geometry information, facial recognition information, and voice recognition information. The biometric sensor may include a sensor for sensing biometric information of the passenger. Here, the monitoring unit 725 and the microphone 723 may operate as a sensor. The biometric sensor may acquire hand geometry information and facial recognition information through the monitoring unit 725.

The output unit 740 is configured to output information processed by the controller 770. The output unit 740 may include a display unit 741, a sound output unit 742, and a haptic output unit 743.

The display unit 741 may display information processed by the controller 770. For example, the display unit 741 may display vehicle associated information. Here, the vehicle associated information may include vehicle control information for direct control of the vehicle or driver assistance information for aiding in driving of the vehicle. In addition, the vehicle associated information may include vehicle state information that indicates the current state of the vehicle or vehicle traveling information regarding traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle and the user and also function to provide an output interface between the vehicle and the user. In this case, the display unit 741 may include a touch sensor which senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

In some implementations, the display unit 741 may include a cluster to allow the driver to check vehicle state information or vehicle traveling information while driving the vehicle. The cluster may be located on a dashboard. In this case, the driver may check information displayed on the cluster while looking forward.

In some implementations, the display unit 741 may be implemented as a head up display (HUD). When the display unit 741 is implemented as a HUD, information may be output via a transparent display provided at the windshield. Alternatively, the display unit 741 may include a projector module to output information via an image projected onto the windshield.

The sound output unit 742 is configured to convert electrical signals from the controller 170 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control of a power source inside the vehicle.

For example, in the case where a fossil fuel based engine is a power source, the power source drive unit 751 may perform electronic control of the engine. As such, the power source drive unit 751 may control, for example, an output torque of the engine. In the case where the power source drive unit 751 is an engine, the power source drive unit 751 may control the speed of the vehicle by controlling the output torque of the engine under the control of the controller 770.

In another example, in the case where an electric motor is a power source, the power source drive unit 751 may perform control of the motor. As such, the power source drive unit 751 may control, for example, the RPM and torque of the motor.

The steering drive unit 752 may perform electronic control of a steering apparatus inside the vehicle. The steering drive unit 752 may change the direction of travel of the vehicle.

The brake drive unit 753 may perform electronic control of a brake apparatus inside the vehicle. For example, the brake drive unit 753 may reduce the speed of the vehicle by controlling the operation of brakes located at wheels. In another example, the brake drive unit 753 may adjust the direction of travel of the vehicle leftward or rightward by differentiating the operation of respective brakes located at left and right wheels.

The lamp drive unit 754 may turn at least one lamp arranged inside and outside the vehicle on or off. In addition, the lamp drive unit 754 may control, for example, the intensity and direction of light of each lamp. For example, the lamp drive unit 754 may perform control of a turn signal lamp or a brake lamp.

The air conditioner drive unit 755 may perform electronic control of an air conditioner inside the vehicle. For example, when the interior temperature of the vehicle is high, the air conditioner drive unit 755 may operate the air conditioner to supply cold air to the interior of the vehicle.

The window drive unit 756 may perform electronic control of a window apparatus inside the vehicle. For example, the window drive unit 756 may control opening or closing of left and right windows of the vehicle.

The airbag drive unit 757 may perform the electronic control of an airbag apparatus inside the vehicle. For example, the airbag drive unit 757 may control an airbag to be deployed in a dangerous situation.

The sunroof drive unit 758 may perform electronic control of a sunroof apparatus inside the vehicle. For example, the sunroof drive unit 758 may control opening or closing of a sunroof.

The suspension drive unit 759 may perform electronic control of a suspension apparatus inside the vehicle. For example, when a road surface is uneven, the suspension drive unit 759 may control the suspension apparatus to reduce vibrations of the vehicle.

The memory 730 is electrically connected to the controller 770. The memory 730 may store basic data of the unit, control data for operation control of the unit and input/output data. The memory 730 may be various storage apparatuses, which are implemented in a hardware manner, such as a ROM, RAM, EPROM, flash drive and hard drive. The memory 730 may store a variety of data for overall operation of the vehicle, such as a program for processing or control of the controller 770.

The interface 780 may serve as a passage for various kinds of external devices that are connected to the vehicle. For example, the interface 780 may have a port that is connectable to the mobile terminal 600 and may be connected to the mobile terminal 600 via the port. In this case, the interface 780 may exchange data with the mobile terminal 600.

The interface 780 may serve as a passage for providing electric energy to the connected mobile terminal 600. When the mobile terminal 600 is electrically connected to the interface 780, the interface 780 may provide electric energy supplied from the power supply unit 790 to the mobile terminal 600 under control of the controller 770.

The controller 770 may control the overall operation of each unit inside the vehicle. The controller 770 may be referred to as an Electronic Control Unit (ECU).

The controller 770 may perform a function corresponding to the delivered signal according to delivery of a signal for executing the parking assistance apparatus 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The controller 770 may perform the role of the above-described processor 170. For example, the processor 170 of the parking assistance apparatus 100 may be directly set in the controller 770 of the vehicle. In such an implementation, the parking assistance apparatus 100 may be understood as a combination of some components of the vehicle.

Alternatively, the controller 770 may control the components to transmit information requested by the processor 170.

The power supply unit 790 may supply power required to operate the respective components under the control of the controller 770. For example, in some implementations, the power supply unit 790 may receive power from, for example, a battery inside the vehicle.

The AVN apparatus 400 may exchange data with the controller 770. The controller 770 may receive navigation information from the AVN apparatus or a separate navigation apparatus. Here, the navigation information may include destination information, information on a route to the destination, map information related to vehicle traveling and current position information of the vehicle.

The above described features, configurations, effects, and the like are included in at least some implementations, and should not be limited to only one implementation. In addition, the features, configurations, effects, and the like as illustrated in each implementation may be implemented with regard to other implementations as they are combined with one another or modified by those skilled in the art. Thus, content related to these combinations and modifications should be construed as including in the scope and spirit of the disclosure as disclosed in the accompanying claims.

Further, although the implementations have been mainly described until now, they are just exemplary and do not limit the present disclosure. Thus, various modifications and applications which have not been exemplified may be made within a range which does not deviate from the essential characteristics of the implementations. For instance, the constituent elements described in detail in the exemplary implementations can be modified to be carried out. Further, the differences related to such modifications and applications shall be construed to be included in the scope of the present disclosure specified in the attached claims.

What is claimed is:

1. A parking assistance apparatus, comprising:
   a display unit configured to display an image of an area around a vehicle;
   a sensor unit configured to detect at least one object around the vehicle; and
   at least one processor configured to perform an automatic parking function that moves the vehicle to a target parking position by:
      setting a monitoring region around the vehicle, the monitoring region including a region within a predetermined radius from a parking path of the vehicle;
      setting, based on a movement direction and a movement speed of the at least one object, a boundary region around the at least one object;
      determining an overlap region between the monitoring region around the vehicle and the boundary region around the at least one object;
      assigning a weight value to the at least one object based on one or more characteristics of the at least one object in the monitoring region including a size of the determined overlap region;
      calculating, based on a number of the at least one object in the monitoring region and the weight value assigned to the at least one object, a congestion level for the automatic parking function; and
      executing the automatic parking function according to the calculated congestion level.

2. The parking assistance apparatus of claim 1, wherein the at least one processor is configured to:
   determine a first region within a first distance from the vehicle; and
   calculate the congestion level for the automatic parking function according to a number of the at least one object detected within the first region.

3. The parking assistance apparatus of claim 1, wherein the at least one processor is configured to raise the weight value assigned to the at least one object as a distance between the vehicle and the at least one object decreases.

4. The parking assistance apparatus of claim 1, wherein the at least one processor is configured to raise the weight value assigned to the at least one object as the size of the determined overlap region increases.

5. The parking assistance apparatus of claim 1, wherein the at least one processor is configured to:
   detect a type of the at least one object by performing a machine learning operation on at least one image of the at least one object; and
   assign, based on the detected type of the at least one object, the weight value to the at least one object.

6. The parking assistance apparatus of claim 1, wherein the at least one processor is configured to:
   calculate an expected duration for the automatic parking function that increases with increasing values of the congestion level; and
   control the display unit to further display the congestion level and the expected duration for the automatic parking function.

7. The parking assistance apparatus of claim 1, wherein the at least one processor is configured to determine, according to the congestion level for the automatic parking function, a boundary range of the vehicle based on which the vehicle performs at least one braking operation during the automatic parking function, the boundary range indicating a range within which the vehicle is controlled to travel during the automatic parking function.

8. The parking assistance apparatus of claim 7, wherein the at least one processor is configured to determine the boundary range of the vehicle according to the congestion level by:
   determining a first size of the boundary range of the vehicle in a first state in which the congestion level is a first level; and
   determining a second size of the boundary range, larger than the first size, in a second state in which the congestion level is a second level that is lower than the first level.

9. The parking assistance apparatus of claim 8, wherein the at least one processor is configured to determine a size of the boundary range of the vehicle differently depending on a parking path by which the vehicle is controlled to travel during the automatic parking function.

10. The parking assistance apparatus of claim 7, wherein the at least one processor is configured to determine, according to the boundary range of the vehicle, a movement speed of the vehicle for the automatic parking function.

11. The parking assistance apparatus of claim 10, wherein the at least one processor is configured to:
   perform the automatic parking function to control the vehicle to move at a first speed in a first state in which a size of the boundary range of the vehicle is a first size; and
   perform the automatic parking function to control the vehicle to move at a second speed, greater than the first speed, in a second state in which the size of the boundary range of the vehicle is a second size that is greater than the first size.

12. The parking assistance apparatus of claim 7, wherein the at least one processor is configured to:
   determine the boundary range of the vehicle according to a parking path by which the vehicle is controlled to travel during the automatic parking function; and
   control the display unit to further display the parking path and the boundary range of the vehicle.

13. The parking assistance apparatus of claim 12, wherein the at least one processor is configured to:
control the display unit to display the image of the area around the vehicle with a first zoom in a first state in which a size of the boundary range is a first size; and
control the display unit to display the image of the area around the vehicle with a second zoom that is less than the first zoom in a second state in which the size of the boundary range is a second size greater than the first size.

14. The parking assistance apparatus of claim 1, wherein the at least one processor is configured to:
determine a first parking path by which the vehicle is controlled to travel to the target parking position during the automatic parking function, based on the congestion level being a first congestion level; and
determine a second parking path, different from the first parking path, based on the congestion level being a second congestion level different from the first congestion level.

15. The parking assistance apparatus of claim 14, wherein:
the second congestion level is greater than the first congestion level, and
the at least one processor is configured to determine the second parking path having a second number of turns that is greater than a first number of turns in the first parking path.

16. The parking assistance apparatus of claim 14, wherein:
the second congestion level is greater than the first congestion level, and
the at least one processor is configured to determine the second parking path having a second maximum movement position that is smaller than a first maximum movement position of the first parking path.

17. The parking assistance apparatus of claim 14, wherein the at least one processor is configured to:
determine the first parking path based on a first parking method that depends on the first congestion level; and
determine the second parking path based on a second parking method, different from the first parking method, based on the second congestion level.

18. The parking assistance apparatus of claim 14, wherein the at least one processor is configured to:
control the display unit to display the first parking path in a first state in which the congestion level is the first congestion level; and
control the display unit to display the second parking path in a second state in which the congestion level is the second congestion level.

19. A method of providing an automatic parking function, comprising:
sensing an environment around a vehicle;
obtaining information about at least one object in the environment around the vehicle; and
performing an automatic parking function that moves the vehicle to a target parking position by:
setting a monitoring region around the vehicle, the monitoring region including a region within a predetermined radius from a parking path of the vehicle;
setting, based on a movement direction and a movement speed of the at least one object, a boundary region around the at least one object;
determining an overlap region between the monitoring region around the vehicle and the boundary region around the at least one object;
assigning a weight value to the at least one object based on one or more characteristics of the at least one object in the monitoring region including a size of the determined overlap region;
calculating, based on a number of the at least one object in the monitoring region and the weight value assigned to the at least one object, a congestion level for the automatic parking function; and
executing the automatic parking function according to the calculated congestion level.

20. The method of claim 19, wherein calculating the congestion level of the environment around the vehicle based on the information about the at least one object comprises:
calculating the congestion level based on a number of the at least one object detected within a first region around the vehicle.

21. The method of claim 19, wherein executing the automatic parking function according to the calculated congestion level comprises:
determining, according to the congestion level, a size of a boundary range of the vehicle based on which the vehicle performs at least one braking operation during the automatic parking function, the boundary range indicating a range within which the vehicle is controlled to travel during the automatic parking function.

22. The method of claim 21, wherein executing the automatic parking function according to the calculated congestion level further comprises:
determining a movement speed of the vehicle for the automatic parking function according to the determined boundary range of the vehicle.

23. A vehicle comprising the parking assistance apparatus of claim 1.

* * * * *